United States Patent [19]

Nishimura

[11] Patent Number: 5,695,020

[45] Date of Patent: Dec. 9, 1997

[54] CRUISE CONTROLLER FOR VEHICLES

[75] Inventor: Eiji Nishimura, Higashihiroshima, Japan

[73] Assignee: Mazda Motor Corp., Hiroshima, Japan

[21] Appl. No.: 245,769

[22] Filed: May 18, 1994

[30] Foreign Application Priority Data

May 19, 1993 [JP] Japan .................................. 5-117007

[51] Int. Cl.$^6$ .................................................. B60K 31/00
[52] U.S. Cl. .................. 180/169; 180/170; 364/426.044; 364/461; 340/903
[58] Field of Search .................. 180/167, 169, 180/178, 179, 170; 340/901, 903; 364/426.04, 424.05, 461, 426.044

[56] References Cited

U.S. PATENT DOCUMENTS

| 4,622,636 | 11/1986 | Tachibana | 180/169 |
|---|---|---|---|
| 4,706,195 | 11/1987 | Yoshino et al. | 364/461 |
| 4,763,746 | 8/1988 | Ochiai . | |
| 4,914,595 | 4/1990 | Suzuki et al. | 180/178 |
| 4,967,357 | 10/1990 | Mimura et al. | 180/178 |
| 5,014,200 | 5/1991 | Chundrlik et al. | 180/170 |
| 5,053,979 | 10/1991 | Etoh | 180/169 |
| 5,165,497 | 11/1992 | Chi | 180/169 |
| 5,166,881 | 11/1992 | Akasu | 180/170 |
| 5,173,859 | 12/1992 | Deering . | |
| 5,189,619 | 2/1993 | Adachi et al. | 180/170 |
| 5,197,562 | 3/1993 | Kakinami et al. | 180/169 |
| 5,215,159 | 6/1993 | Nishida | 180/179 |
| 5,230,400 | 7/1993 | Kakinami et al. | 364/461 |
| 5,375,060 | 12/1994 | Nocker | 180/169 |
| 5,400,864 | 3/1995 | Winner et al. | 180/169 |
| 5,594,645 | 1/1997 | Nishimura et al. | 364/426.044 |

FOREIGN PATENT DOCUMENTS

| 58-29018 | 2/1983 | Japan . |
|---|---|---|
| 61-6034 | 1/1986 | Japan . |
| 61-150835 | 7/1986 | Japan . |
| 63-269736 | 11/1988 | Japan . |
| 3-118700 | 5/1991 | Japan . |

*Primary Examiner*—Karen B. Merritt
*Assistant Examiner*—Min Yu
*Attorney, Agent, or Firm*—Staas & Halsey

[57] ABSTRACT

A vehicle which can execute both vehicle-speed based auto-cruising control and vehicle-interval distance based auto-cruising control has a single operation knob having a SET switch, a RESUME switch, and a COAST switch. In order to allow the single operation knob to set both a target vehicle speed and a target vehicle-interval distance, when the SET switch is operated during the vehicle-speed based auto-cruising control, a vehicle speed at the time of the operation or at the end of the switch operation is set to be the target vehicle speed; when the SET switch is operated during vehicle-interval distance based auto-cruising control, a vehicle-interval distance at the time of the operation or at the end of the switch operation is set to be the target vehicle-interval distance.

22 Claims, 26 Drawing Sheets

| Gm \ Vm | SMALLER (1) | LARGER (2) |
|---|---|---|
| SLOWER (1) | $D_{11} = D_{11} + D_m$<br><br>$n_{11} = n_{11} + 1$<br><br>$[D_{11}] = D_{11} / n_{11}$ | $D_{21} = D_{21} + D_m$<br><br>$n_{21} = n_{21} + 1$<br><br>$[D_{21}] = D_{21} / n_{21}$ |
| FASTER (2) | $D_{12} = D_{12} + D_m$<br><br>$n_{12} = n_{12} + 1$<br><br>$[D_{12}] = D_{12} / n_{12}$ | $D_{22} = D_{22} + D_m$<br><br>$n_{22} = n_{22} + 1$<br><br>$[D_{22}] = D_{22} / n_{22}$ |

| MAX θ<br>VSPST | SMALLER (1) | LARGER (1) |
|---|---|---|
| SLOWER<br>(1) | $G_{11} = G_{11} + G$<br>$C_{11} = C_{11} + 1$<br>$[G_{11}] = G_{11} / C_{11}$ | $G_{21} = G_{21} + G$<br>$C_{21} = C_{21} + 1$<br>$[G_{21}] = G_{21} / C_{21}$ |
| FASTER<br>(1) | $G_{12} = G_{12} + G$<br>$C_{12} = C_{12} + 1$<br>$[G_{12}] = G_{12} / C_{12}$ | $G_{22} = G_{22} + G$<br>$C_{22} = C_{22} + 1$<br>$[G_{22}] = G_{22} / C_{22}$ |

CRUISE CONTROLLER FOR VEHICLES

BACKGROUND OF THE INVENTION

1. Field of the Invention

The present invention relates to a cruise controller for vehicles and, more particularly, to a cruise controller for vehicles, which can execute vehicle-speed based F/B (feedback) control and vehicle-interval distance based F/B control.

2. Description of the Related Art

An auto-cruise function includes vehicle-speed based F/B control for automatically maintaining the vehicle speed of a driver's own vehicle to be a target vehicle speed set by the driver, and vehicle-interval distance based F/B control for maintaining the vehicle-interval distance to a vehicle ahead to be a distance set by the driver.

Many vehicles comprising such auto-cruise functions have been proposed.

For example, Japanese Patent Laid-Open No. 63-269736 discloses a cruise controller for vehicles having both the vehicle-speed based F/B control function and the vehicle-interval distance based F/B control function, wherein a control gain for the vehicle-interval distance based F/B control is changed in accordance with the traveling state in an auto-cruise mode, thus allowing quick convergence to a target vehicle-interval distance.

Japanese Patent Laid-Open No. 3-118700 discloses a cruise controller for vehicles having the vehicle-interval distance based F/B auto-cruise control function, wherein a target vehicle-interval distance is set in accordance with the coefficient of friction of a road surface.

Japanese Patent Laid-Open No. 61-150835 discloses a cruise controller for vehicles having both the vehicle-speed based F/B control function and the vehicle-interval distance based F/B control function, wherein the vehicle-speed based F/B control is executed based on previous vehicle speed data when the vehicle-interval distance cannot be detected.

Japanese Patent Laid-Open No. 61-6034 discloses a cruise controller for vehicles having the vehicle-speed based F/B control function, wherein a target vehicle speed during traveling on a curve of a road is set in correspondence with the curvature of the curve, so that a vehicle can travel on the curve at a proper target vehicle speed.

Furthermore, in a controller using the vehicle-speed based F/B control disclosed in Japanese Patent Laid-Open No. 58-29018, the acceleration of a vehicle in a normal driving state is detected, and is learned by storing acceleration data in correspondence with the acceleration generation frequency. This learning coincides with an acceleration to be obtained when the vehicle-speed based F/B control mode is canceled to resume a normal traveling mode, or an acceleration to be obtained when the vehicle-speed based F/B control mode is resumed from the normal traveling mode with the acceleration feeling intended by a driver (i.e., the learned acceleration).

Since such auto-cruise control is executed by a driver during traveling, various operation devices are required. For example, the auto-cruise controller of Japanese Patent Laid-Open No. 63-269736 is provided with a COAST switch, a RESUME switch, and a SET switch.

A vehicle which can execute vehicle-speed based F/B control is normally provided with the SET switch so as to be able to set a target vehicle speed. In order to allow such a vehicle to execute vehicle-interval distance based F/B control, a switch for setting a target vehicle-interval distance and the like are required.

Therefore, since a conventional vehicle which can execute both the vehicle-speed based F/B control and the vehicle-interval distance based F/B control requires two switches for respectively setting the target vehicle speed and the target vehicle-interval distance, many switches are arranged around a driver seat, and cumbersome operations are required. In addition, such switches are not preferable in terms of design.

SUMMARY OF THE INVENTION

The present invention has been made to eliminate the conventional drawbacks, and has as its object to provide an auto-cruise controller in which operation means for setting a target vehicle speed is commonly used for setting a target vehicle-interval distance in a vehicle which can execute both vehicle-speed based F/B control and vehicle-interval distance based F/B control.

In order to achieve the above object, according to one aspect of the present invention, there is provided a cruise control apparatus comprising:

operation means for setting a target vehicle speed via an operation of a driver;

vehicle-speed based auto-cruising control means for controlling a vehicle speed toward the target vehicle speed set by the operation means;

vehicle-interval distance based auto-cruising control means for maintaining a vehicle-interval distance to a vehicle ahead to be a predetermined target vehicle-interval distance; and conversion means for detecting operation information from the operation means under a predetermined condition, converting the detected operation information into vehicle-interval distance information, and outputting the converted vehicle-interval distance information to the vehicle-interval distance based auto-cruising control means.

According to another aspect of the present invention, there is provided a cruise control apparatus comprising:

operation means for outputting a predetermined signal in accordance with an operation of a driver;

vehicle-speed based auto-cruising control means for converting the signal from the operation means into a target vehicle speed signal and controlling a vehicle speed toward a target vehicle speed on the basis of the converted signal in a first mode; and vehicle-interval distance based auto-cruising control means for converting the signal from the operation means into a target vehicle-interval distance signal and maintaining a vehicle-interval distance to a vehicle ahead to be a target vehicle-interval distance on the basis of the converted signal in a second mode.

According to still another aspect of the present invention, there is provided a cruise control apparatus, which can individually execute vehicle-speed based auto-cruising control for controlling a vehicle speed toward a target vehicle speed, and vehicle-interval distance based auto-cruising control for maintaining a vehicle-interval distance to a vehicle ahead to be a target vehicle-interval distance, comprising:

an operation member having a first switch which can be depressed by a driver;

an operation sensor for detecting the operation of the first switch by the driver;

a vehicle speed sensor for detecting a vehicle speed;

a distance sensor for detecting a vehicle-interval distance to the vehicle ahead;

a conversion section for receiving outputs from the operation sensor, the vehicle speed sensor, and the distance sensor, for, when the first switch is operated in a vehicle-speed based auto-cruising mode, converting vehicle speed data detected by the vehicle speed sensor at that time into target vehicle speed data, and for, when the first switch is operated in a vehicle-interval distance based auto-cruising mode, converting vehicle-interval distance data detected by the distance sensor at that time into target vehicle-interval distance data; and a control section for controlling the vehicle speed toward the converted target vehicle speed in the vehicle-speed based auto-cruising mode, and for controlling the vehicle-interval distance to the vehicle ahead toward the converted target vehicle-interval distance in the vehicle-interval distance based auto-cruising mode.

It is another object of the present invention to provide an auto-cruise controller which guarantees smooth operations of operation means to be commonly used in an operation for vehicle-interval distance based F/B control and an operation for vehicle-speed based F/B control.

It is still another object of the present invention to provide an auto-cruise controller which has operation means whose operation for increasing the target vehicle speed in vehicle-speed based F/B control coincides with an operation for decreasing the target vehicle-interval distance in vehicle-interval distance based F/B control.

It is still another object of the present invention to provide an auto-cruise controller which can decrease the target vehicle-interval distance by continuously operating operation means (e.g., a SET switch) in vehicle-interval distance based F/B control.

It is still another object of the present invention to provide an auto-cruise controller which has operation means whose operation for decreasing the target vehicle speed in vehicle-speed based F/B control coincides with an operation for increasing the target vehicle-interval distance in vehicle-interval distance based F/B control.

It is still another object of the present invention to provide an auto-cruise controller which can increase the target vehicle-interval distance by continuously operating operation means (e.g., a COAST switch) in vehicle-interval distance based F/B control.

It is still another object of the present invention to provide an auto-cruise controller which has operation means whose operation for setting a target vehicle speed in vehicle-speed based F/B control (e.g., depression of a SET switch for a short period of time) coincides with an operation for setting a target vehicle-interval distance in vehicle-interval distance based F/B control.

Other features and advantages of the present invention will be apparent from the following description taken in conjunction with the accompanying drawings, in which like reference characters designate the same or similar parts throughout the figures thereof.

DETAILED DESCRIPTION OF EMBODIMENTS

The preferred embodiment of the present invention will be described hereinafter with reference to the accompanying drawings.

<System Arrangement>

Figure 1:
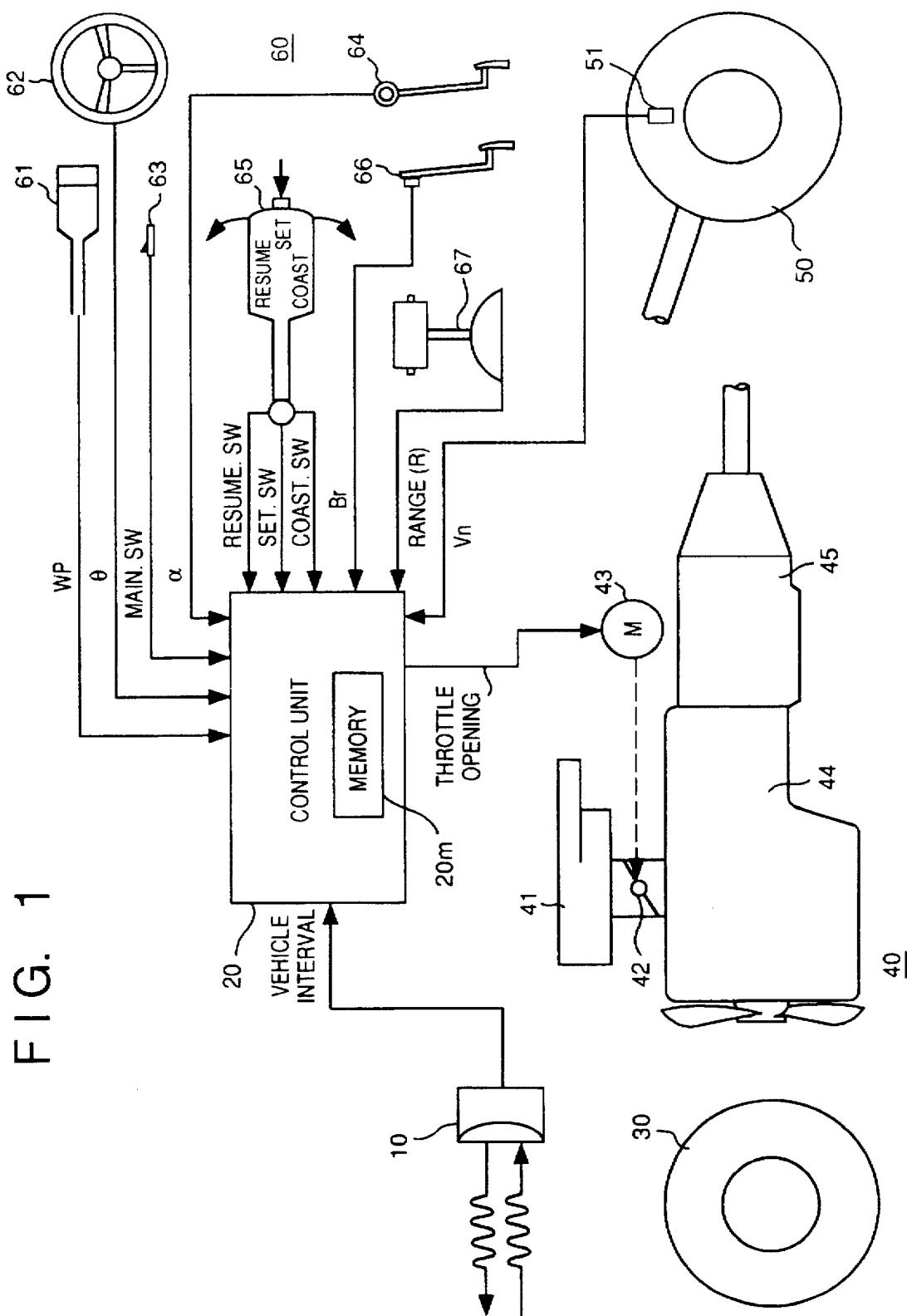
FIG. 1 is a diagram showing the arrangement of the entire auto-cruise system according to a preferred embodiment of the present invention.

FIG. 1 shows the arrangement of an auto-cruise system to which the present invention is applied. This system can execute feedback control for maintaining the vehicle speed of the auto-cruise system operator's own vehicle to be a proper vehicle speed (to be referred to as "vehicle speed based F/B control" or "S-type F/B control" hereinafter) and feedback control for maintaining the vehicle-interval distance to a vehicle ahead to be a proper vehicle-interval distance (to be referred to as "vehicle-interval distance based F/B control" or "D type F/B control" hereinafter). The system shown in FIG. 1 mainly comprises a distance sensor 10 for detecting the distance to the vehicle ahead (or an object ahead), an engine 40 (reference numeral 44 denotes an engine main body; and 45, an automatic transmission), operation devices (sensors/switches) 60, and a control unit 20 for executing the control of this embodiment. The system of this embodiment changes the speed of the auto-cruise system operator's own vehicle so as to maintain a constant vehicle speed or vehicle-interval distance. The speed of the auto-cruise system operator's own vehicle is changed by controlling the opening degree of a throttle valve 42 by a throttle actuator 43. The control unit 20 controls the throttle actuator 43. The sensors/switches 60 include a wiper switch (not shown) for outputting a signal WP upon operation of a wiper 61, a steering angle sensor (not shown) for detecting a steering operation angle (to be referred to as a steering angle hereinafter) θ of a steering wheel 62, a MAIN switch 63 for starting auto-cruise control, an accelerator opening degree sensor 64 for detecting an accelerator opening degree α, an operation switch 65, a brake switch 66 for outputting a signal Br upon depression of a brake pedal, and a range switch (not shown) for outputting a range signal of a selector 67. The operation switch 65 has three functions of a SET switch, a RESUME switch, and a COAST switch, and outputs a signal SETSW, RESUMESW, or COASTSW in accordance with its operation state (e.g., the depression of a center button, or the vertical swing operation or pivot operation of a switch body). The signals from these sensors/switches are input to the control unit 20, and are used in throttle opening degree control, i.e., vehicle speed control of the control unit 20.

Note that in FIG. 1, reference numeral 41 denotes a carburetor; 44, an engine; and 45, a transmission, which constitute a power unit 40 together with the throttle valve 42 and the throttle actuator 43. Reference numeral 30 denotes a front wheel.

An auto-cruise function will be briefly described below.

When a driver wants to start auto-cruise control, he or she must turn on the MAIN switch 63. When the switch 63 is turned on, the auto-cruise control is enabled. The operation member (switch) 65 has the push-button type SET switch. The driver can vertically swing this operation member 65 on the plane of the drawing of FIG. 1. When the driver swings the operation member 65 upward in FIG. 1, a RESUME mode is set; when he or she swings the operation member 65 downward, a COAST mode is set.

In order to actually start the auto-cruise control, the driver must depress the SET switch at least once. When the SET switch is depressed, the S-type F/B control (or D-type F/B control) is executed in accordance with the vehicle speed (or vehicle-interval distance) at that time. Thereafter, the auto-cruise system controls the vehicle speed or vehicle-interval distance unless the auto-cruise mode is canceled. After the auto-cruise mode is temporarily canceled by depressing, e.g., the brake pedal, when the driver operates the operation member 65 to set the RESUME mode, the vehicle speed or vehicle-interval distance is resumed to a target vehicle speed TGV or a target vehicle-interval distance TGD which was stored when the SET switch was depressed previously. When the COAST switch is depressed, the vehicle speed gradually decreases, or vehicle-interval distance gradually increases.

Figure 2:
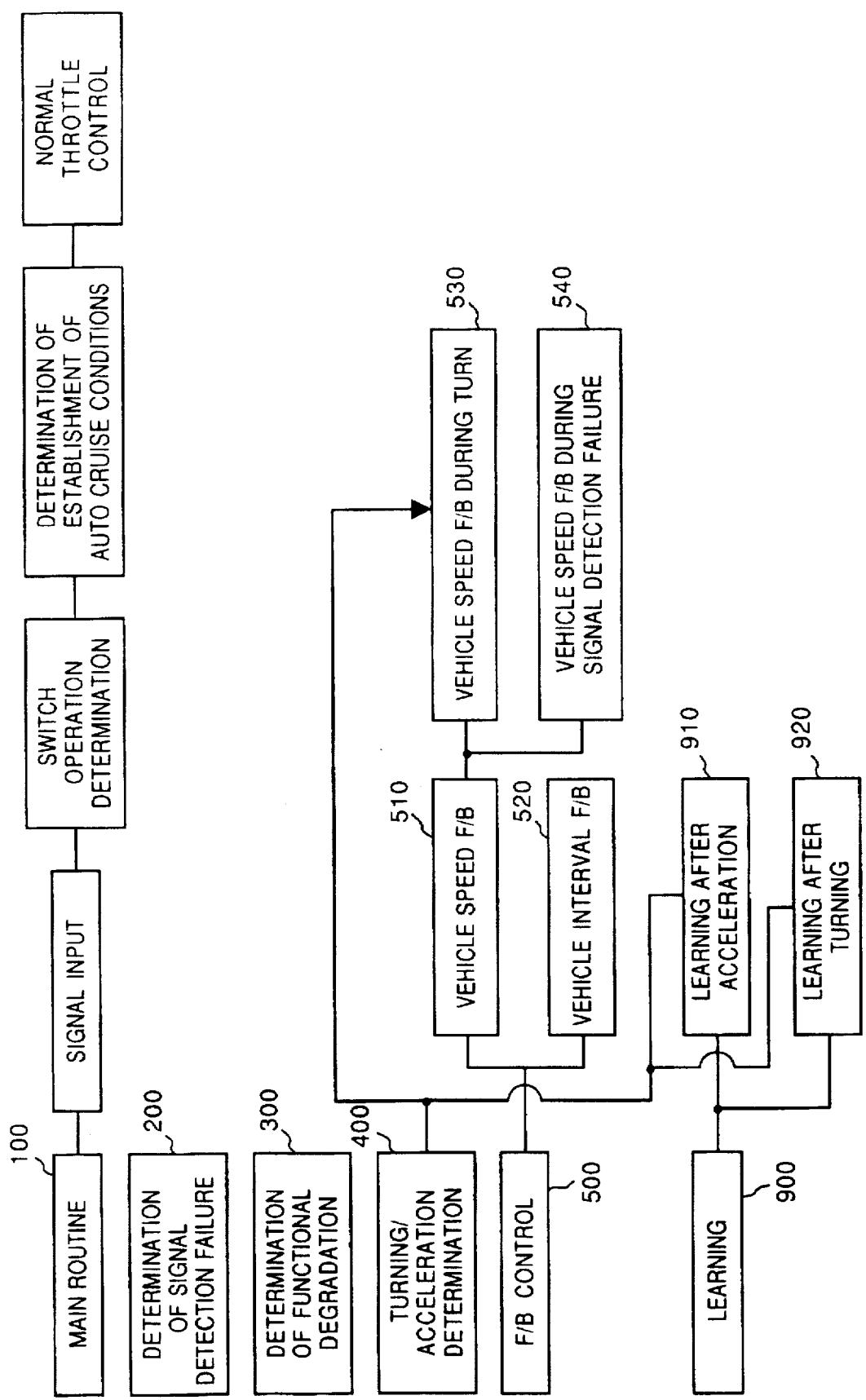
FIG. 2 is a functional block diagram showing the operation of the auto-cruise system of the embodiment shown in FIG. 1.

FIG. 2 is a schematic functional block diagram of the control executed by the system shown in FIG. 1. The control sequence of this system mainly comprises a main routine 100, a block 200 for determining whether or not a signal from the vehicle ahead is missing, a block 300 for determining whether or not the function of the vehicle-interval distance sensor 10 is deteriorated by, e.g., rain or mud, a block 400 for determining whether or not the auto-cruise system operator's own vehicle is turning, a block 500 for executing the D-type F/B control or the S-type F/B control, and calculating a target throttle opening degree, and a block 900 for learning.

In the main routine 100, after the signals are input, switch operation determination, auto-cruise condition establishment determination, and normal throttle control are executed in turn, and their detailed contents will be described later. The F/B control block 500 is roughly divided into a S-type F/B control section 510 and a D-type F/B control section 520, and the S-type F/B control section 510 is further divided into a turning-mode S-type F/B control section 530 and a missing (failure)-mode S-type F/B control section 540. The learning block 900 is divided into a post-acceleration learning section 910 and a post-turning learning section 920. The D-type F/B control section 520 controls the vehicle speed so as to maintain the vehicle-interval distance to be a predetermined target vehicle-interval distance. The post-acceleration learning section 910 accumulates, in a memory 20 m, vehicle-interval distance data detected by the vehicle-interval distance sensor 10 when the auto-cruise control is not active.

Figure 14:
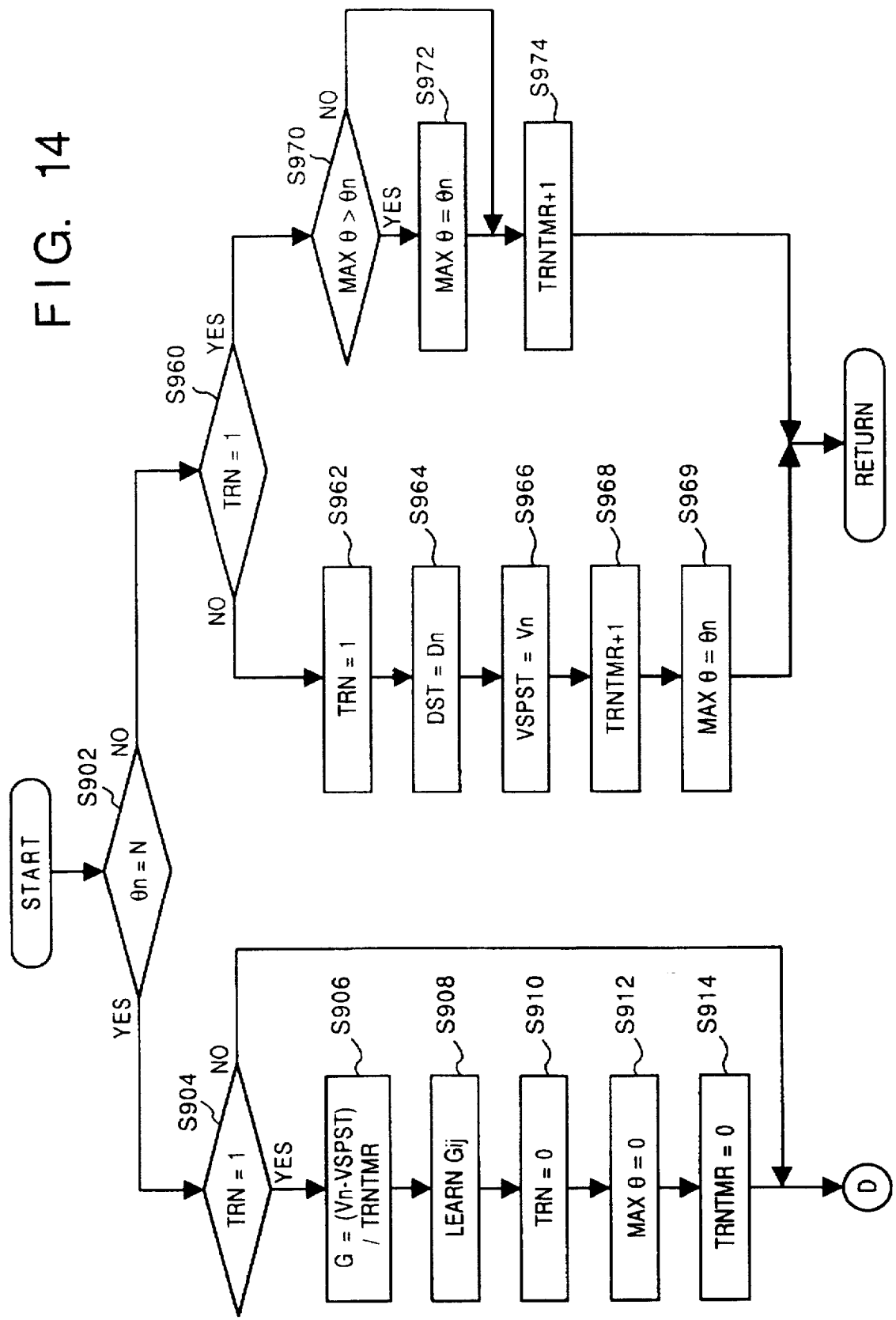
FIG. 14 is a flow chart showing the control sequence for learning in the embodiment shown in FIG. 1.
Figure 15:
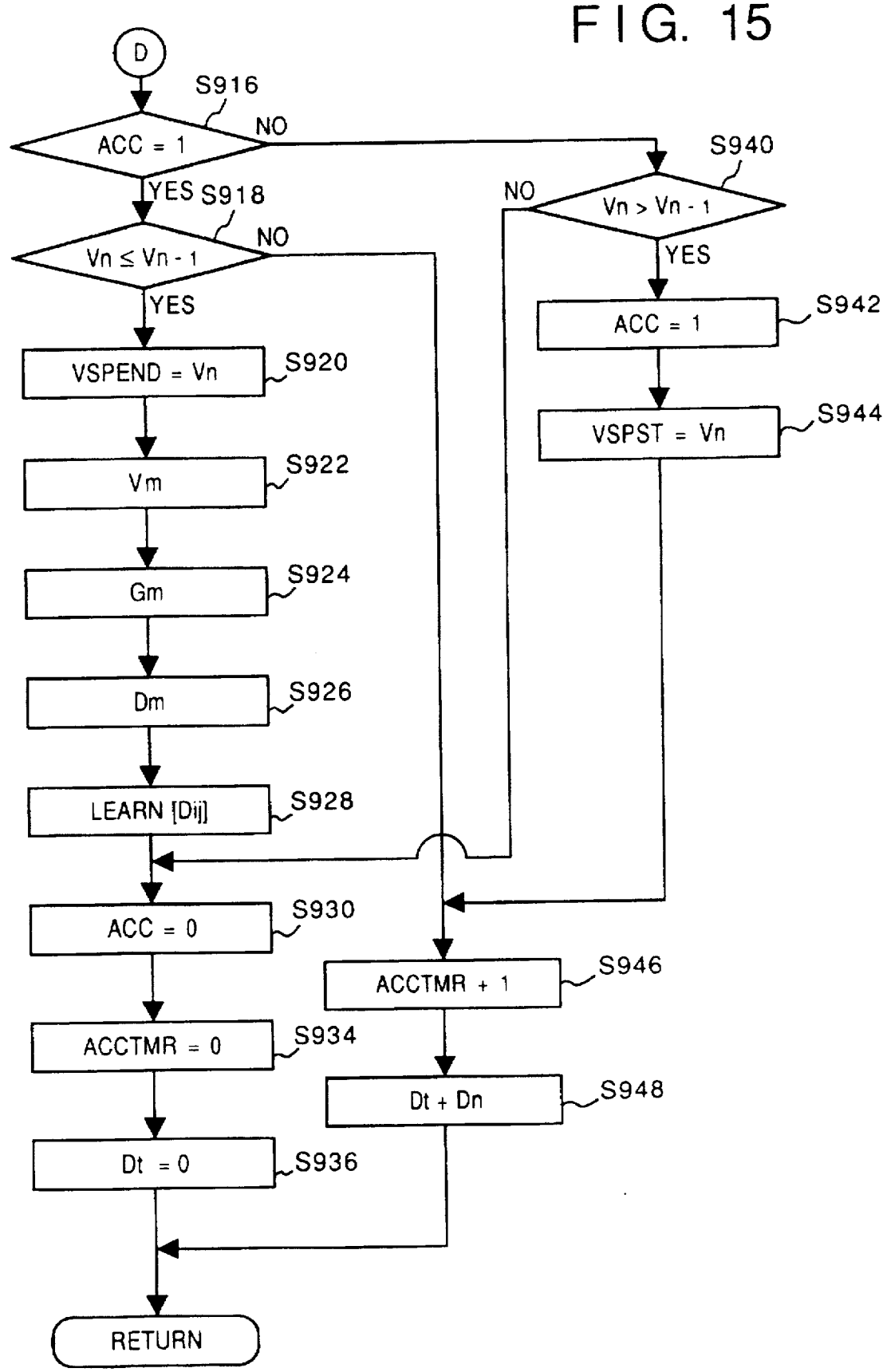
FIG. 15 is a flow chart showing the control sequence for learning in the embodiment shown in FIG. 1.

In the control sequence of the embodiment to be described below, the control sequence turning/acceleration determination block 400 is included in that of the learning block 900 (FIGS. 14 and 15).

<Simplification of Operation>

One feature of the auto-cruise system of this embodiment is simplification of the switch operation. This simplification will become apparent by understanding what control is started upon operation of the operation switch 65. Thus, various driving states will be exemplified below, and the operations of the control of this embodiment according to such driving states will be explained below with reference to the flow charts.

Note that three important controlled variables used in the system of this embodiment will be described below prior to the description of the control.

TG: a register for storing the target throttle opening degree. Throttle opening degree is calculated based on a value stored in the register TG, and the calculated opening degree is output to the actuator 43.

TGV: a register for storing the target vehicle speed used in the S-type F/B control. In the S-type F/B control, the target throttle opening degree TG is determined based on a deviation between TGV and the current vehicle speed $V_n$.

TGD: a register for storing the target vehicle-interval distance used in the D-type F/B control. In the D-type F/B control, the target throttle opening degree TG is determined based on a deviation between TGD and the current vehicle-interval distance $D_n$.

Figure 3:
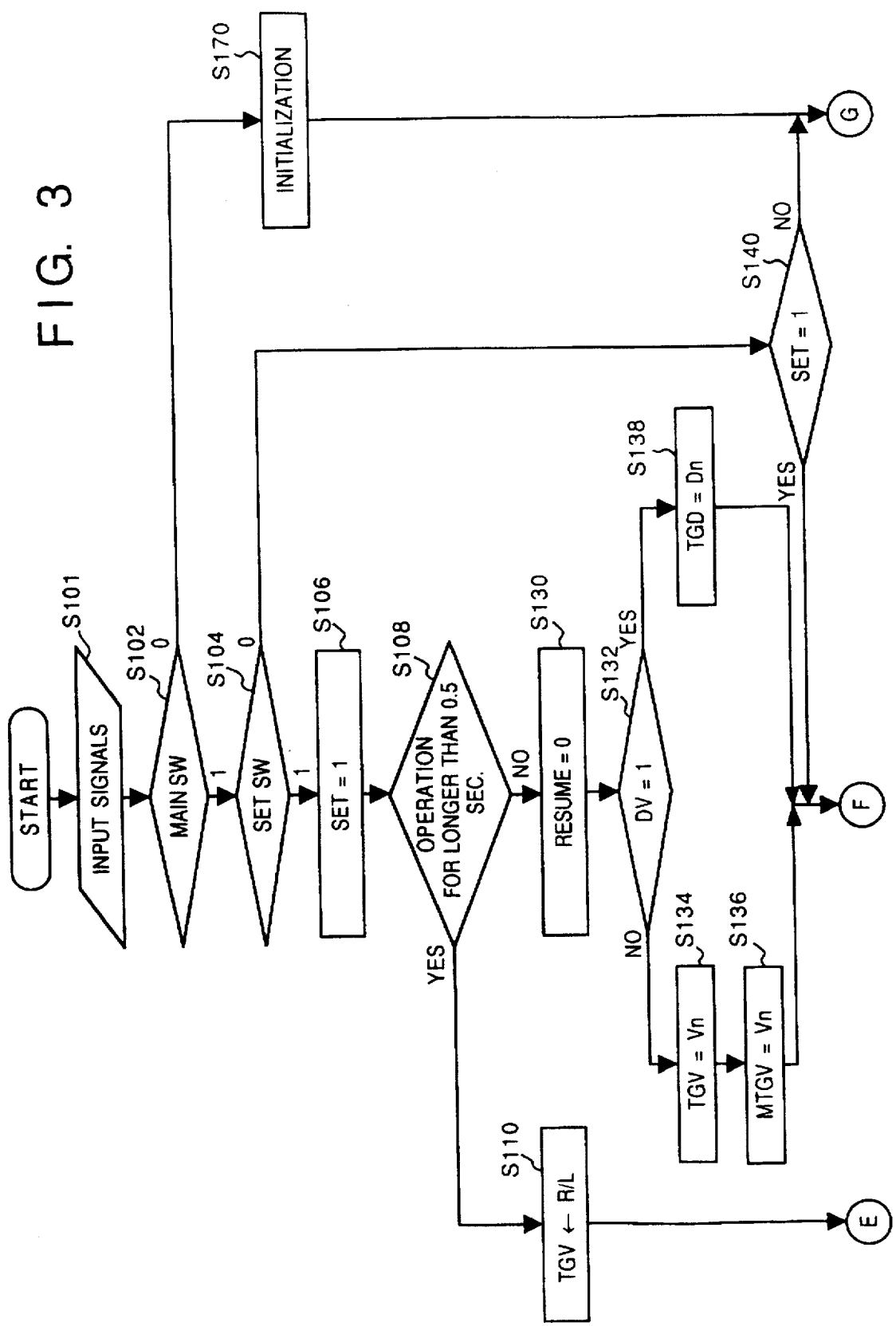
FIG. 3 is a flow chart for explaining the main routine of the control sequence of the embodiment shown in FIG. 1.

The main routine shown in FIG. 3 will be described below. This main routine reveals how simple the operation in the system of this embodiment is.

In step S101, various signals are input. The signals include a range signal R from the selector 67, a brake signal Br from the brake switch 66, an accelerator opening degree α from the accelerator opening degree sensor 64, signals RESUMESW, SETSW, COASTSW, or the like output from the operation member 65 which is used versatilely, a signal MAINSW from the MAIN switch 63, a steering angle θ representing the steering operation angle of the steering wheel 62, a signal WP indicating whether or not the wiper is operating, a vehicle speed signal $V_n$ indicating the current vehicle speed from the vehicle speed sensor 51, a signal $D_n$ indicating the current vehicle-interval distance detected by the distance sensor 10, and the like. Note that a vehicle-interval distance $D_{n-1}$, a vehicle speed $V_{n-1}$, and the like which were measured in the previous control cycle are stored in the memory 20 m in the control unit 20.

Non-auto-cruise State

Figure 5:
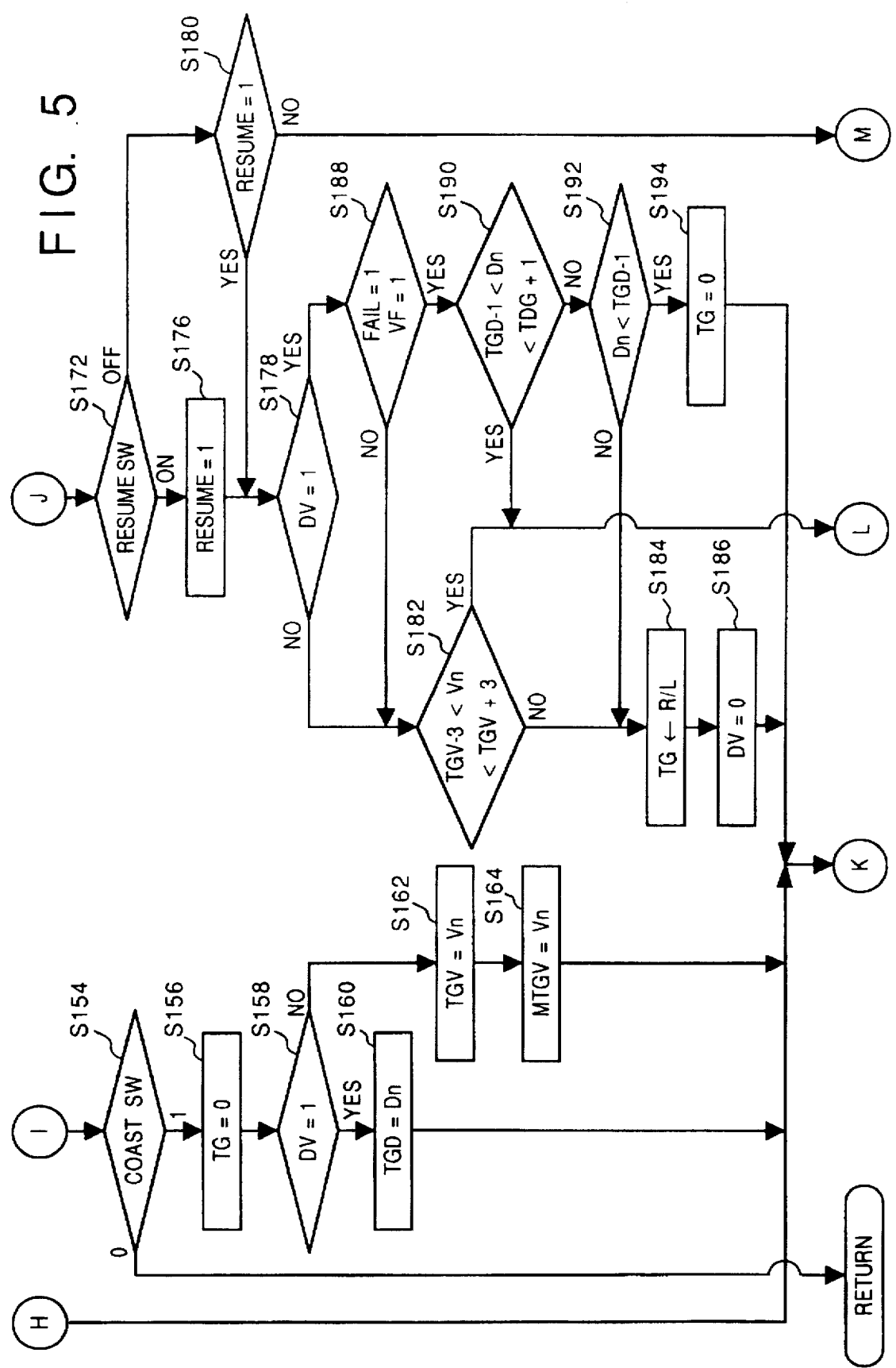
FIG. 5 is a flow chart for explaining the main routine of the control sequence of the embodiment shown in FIG. 1.
Figure 6:
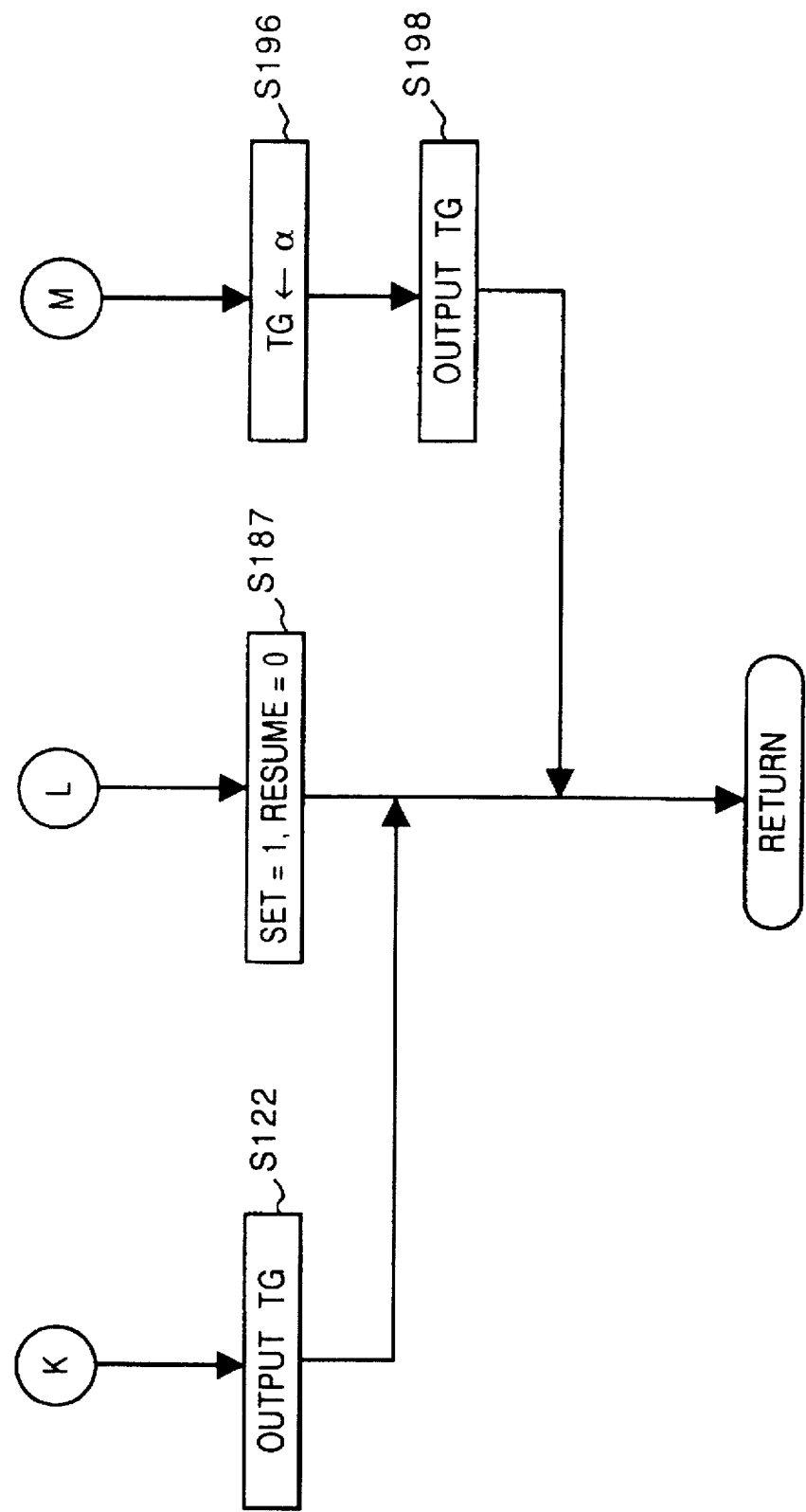
FIG. 6 is a flow chart for explaining the main routine of the control sequence of the embodiment shown in FIG. 1.
Figure 7:
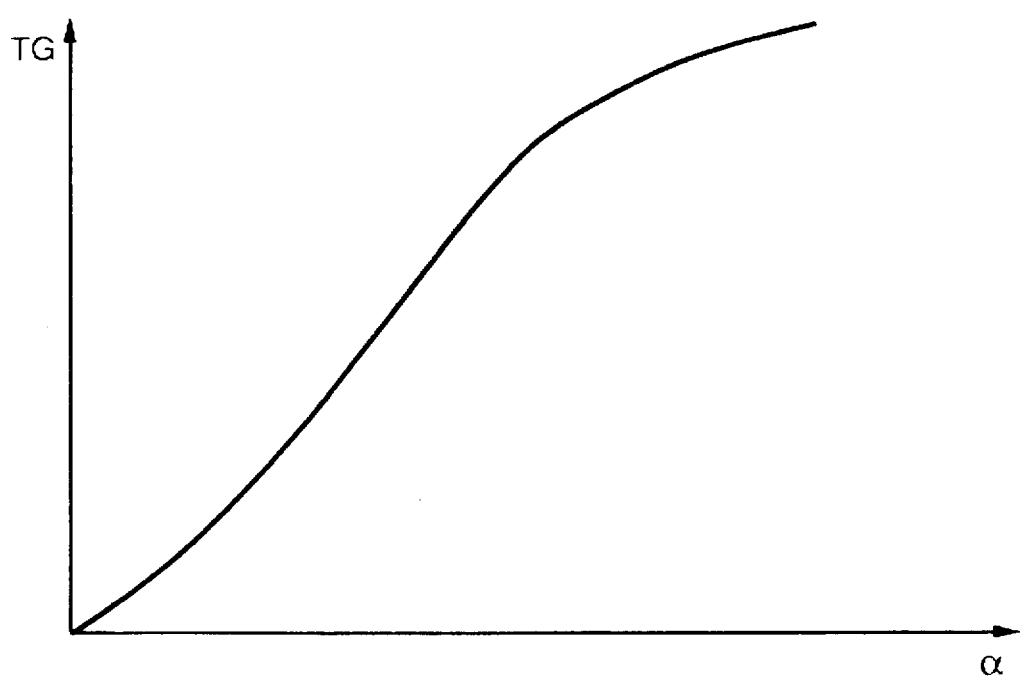
FIG. 7 is a graph showing the relationship between the accelerator opening degree $\alpha$ and the corresponding throttle opening degree TG.

In a non-auto-cruise state, the signals MAINSW and RESUMESW are 0. Therefore, after it is determined in step S102 that the signal MAINSW is 0, the contents of various flags and registers used in the control sequence are initialized. Furthermore, it is determined in step S172 (FIG. 5) that the signal RESUMESW is 0, and it is also determined in step S180 that a flag RESUME is in a reset state. In step S196 (FIG. 6), the target throttle opening degree TG according to the accelerator opening degree α is determined in accordance with the characteristics shown in FIG. 7, and the determined TG is output to the actuator 43 in step S198. As described above, in the non-auto-cruise state, normal throttle opening degree control is executed.

When MAIN Switch is ON

When the MAIN switch 63 is turned on, the flow advances, in turn, to step S102→step S104→step S140→step S172→step S180→step S196→step S198, and the normal throttle control is executed.

When SET Switch is ON for Short Time Period

The SET switch is normally used for setting a current vehicle speed to be an auto-cruising speed. As described above, the system of this embodiment can execute both the S-type F/B control and the D-type F/B control. If the D-type F/B control is being executed when the SET switch is depressed, the interval Dn measured at that time to the vehicle ahead is maintained as target vehicle-interval distance TGD; if the S-type F/B control is being executed when the SET switch is depressed, the vehicle speed $V_n$ of the auto-cruise system operator's own vehicle measured at that time is maintained as target vehicle speed TGV.

If it is determined in step S104 that the signal SETSW is 1, a flag SET is set in step S106 to store that the switch is depressed. After it is determined in step S108 that the switch is depressed for a short period of time (less than 0.5 sec), the flag RESUME is reset in step S130, and the status of a flag DV is checked in step S132. This flag DV is used for storing the F/B control mode which is being currently executed. DV=1 means that the D-type F/B control is being executed; DV=0 means that the S-type F/B control is being executed. If DV=0 (if the S-type F/B control is being executed), the current vehicle speed $V_n$ is set to be a target vehicle speed (TGV=$V_n$) in step S134, and is also set in a register MTGV in step S136. Since the auto-cruise system of this embodiment automatically switches the F/B control mode between the S-type F/B control and the D-type F/B control independently of the operation by a driver, the register MTGV is used for storing a necessary target vehicle speed upon execution of automatic switching (step S524 in FIG. 9).

In steps S142 to S152, it is checked if conditions for executing auto-cruise control are met. Conditions for enabling the auto-cruise control are:

1.: the current vehicle speed $V_n$ falls within a range from 40 km/h to 120 km/h (step S142);
2.: the brake pedal is not depressed (step S144),
3.: the selector 67 is not set in an R (reverse) range (step S146); and
4.: the accelerator pedal is not depressed (step S152).

Even when the SET switch is depressed, as long as the accelerator pedal is kept depressed, the flow advances, in turn, to step S152→step S172→step S178→step S196→step S198, and the normal throttle control is executed. When the accelerator pedal is released, the flow advances from step S152 to step S154. After it is determined in step S154 that the COAST switch is OFF, the flow returns to step S101. Note that the S-type F/B control using the target vehicle speed TGV set in step S134 or the D-type F/B control using the target vehicle-interval distance TGD set in step S138 will be described in detail later with reference to a feedback routine (to be described later with reference to FIGS. 9 to 11).

Steps S142 to S152 also show conditions for canceling the auto-cruise mode. More specifically, if the current vehicle speed $V_n$ becomes lower than 40 km/h or higher than 120 km/h (step S142), if the brake pedal is depressed (step S144), or if the selector 67 is set in the R range (step S146), the flag SET indicating that the auto-cruise control is executed and the flag RESUME indicating that the RESUME operation is executed are reset in steps S148 and S152. When it is detected during the auto-cruise control that the driver depresses the accelerator pedal (YES in step S152), normal throttle control is executed in step S172→step S178→step S196→step S198 to have priority over a driver's intention to accelerate the vehicle. However, since such an acceleration operation is often a temporary one, the auto-cruise mode is not reset. More specifically, the flag SET is not reset.

When SET Switch is ON For 0.5 Sec Or More

When the SET switch is kept ON for 0.5 sec or more, this auto-cruise system interprets this operation to that the driver is intending to accelerate the vehicle. Therefore, in this case, a target throttle opening degree, capable of accelerating the vehicle from the vehicle speed $V_n$ at that time at a predetermined acceleration, is determined, and the S-type F/B control is forcibly started.

Figure 4:
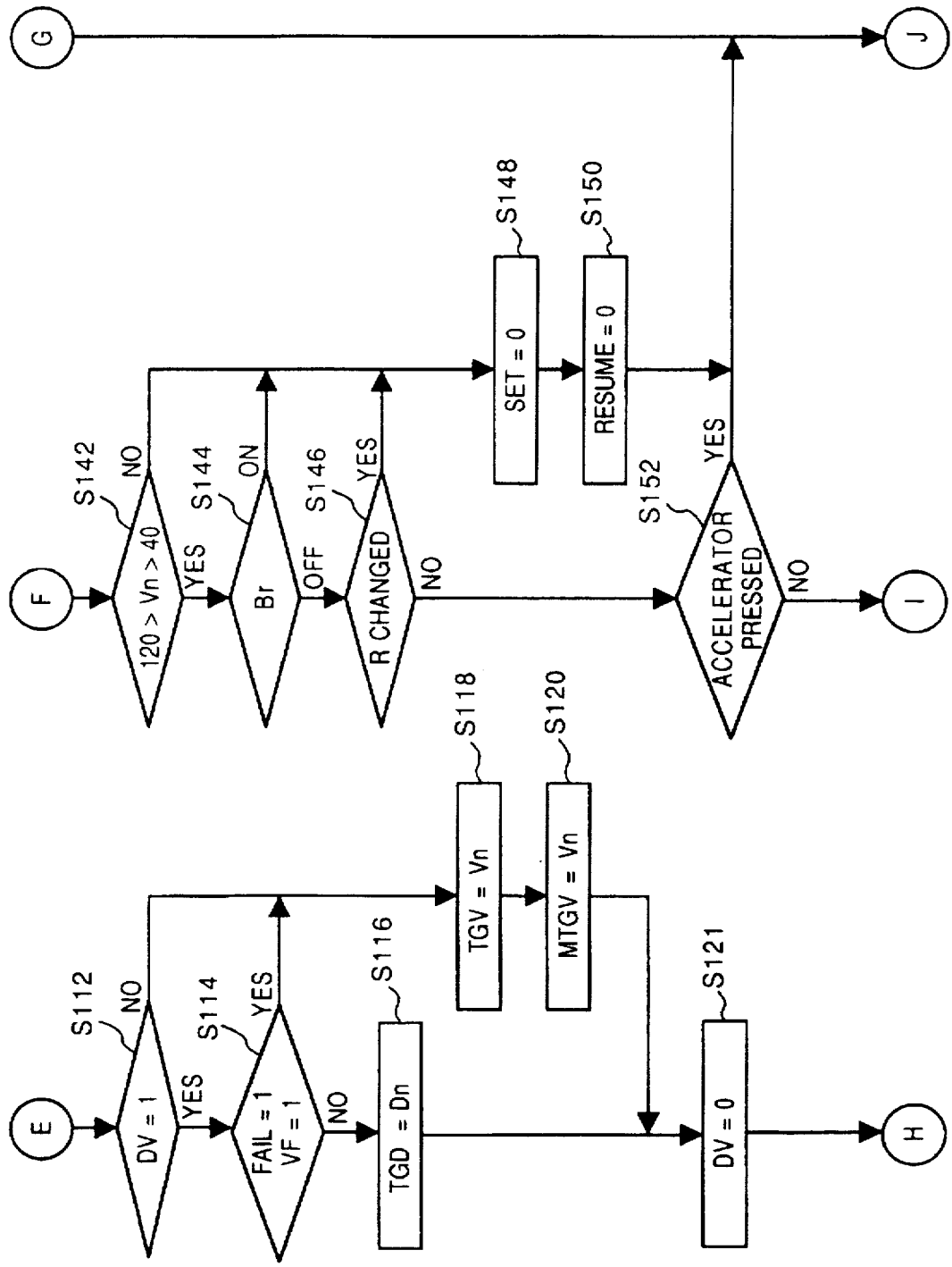
FIG. 4 is a flow chart for explaining the main routine of the control sequence of the embodiment shown in FIG. 1.
Figure 8:
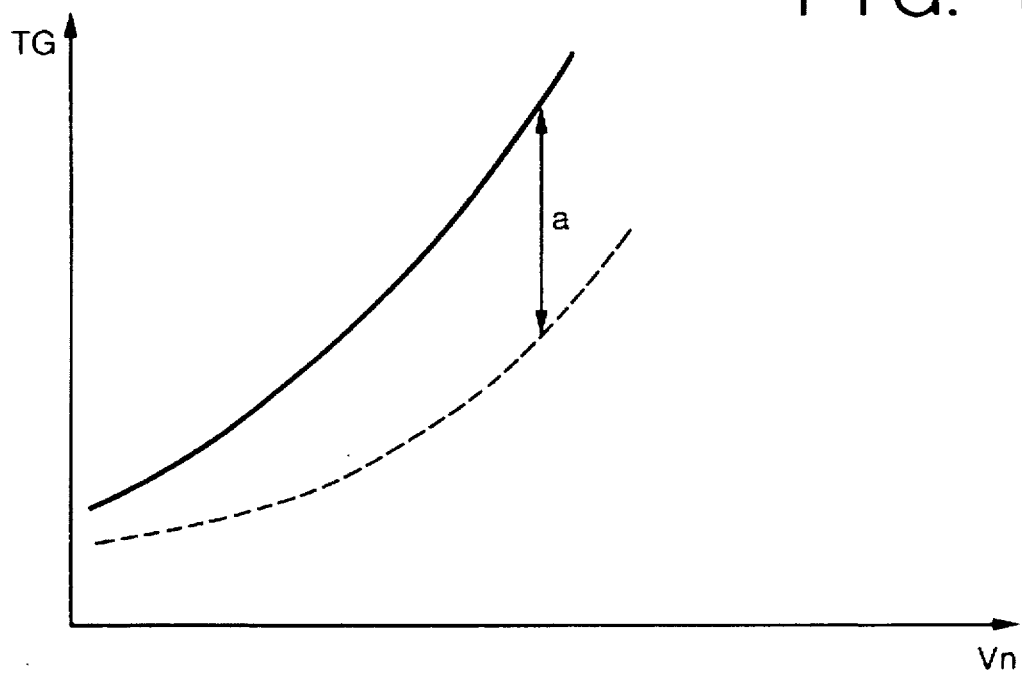
FIG. 8 is a graph showing the relationship between the vehicle speed $V_n$ and the throttle opening degree TG capable of obtaining a constant acceleration a in correspondence with the vehicle speed $V_n$.

More specifically, in step S110, the target throttle opening degree TG according to the vehicle speed $V_n$ at that time is calculated in accordance with the characteristics shown in FIG. 8. This target throttle opening degree TG allows a vehicle to accelerate at a predetermined acceleration a upon traveling of the vehicle on a flat road (see FIG. 8). Furthermore, the control advances, in turn, to step S112 (FIG. 4)→step S118→step S120→step S121. In step S121, the flag DV is reset to store that the following control is to be executed based on the S-type F/B control. The flow then advances to step S122 (FIG. 6), and the throttle opening degree TG capable of obtaining the acceleration a is output to the actuator 43.

Note that in step S112, the flag DV is checked, and depending on the S-type F/B control or the D-type F/B control, the current vehicle-interval distance $D_n$ is saved in the register TGD (step S116) or the current vehicle speed $V_n$ is saved in the registers TGV and MTGV (steps S118 and S120). However, if it is estimated in step S114 that the function of the vehicle-interval distance sensor deteriorates due to, e.g., rain (flag FAIL=1), or if the vehicle ahead is missing (flag VF=1), even when the D-type F/B control is being executed (DV=1), the flow forcibly advances to step S118 to set the current vehicle speed $V_n$ in the registers TGV and MTGV.

Figure 9:
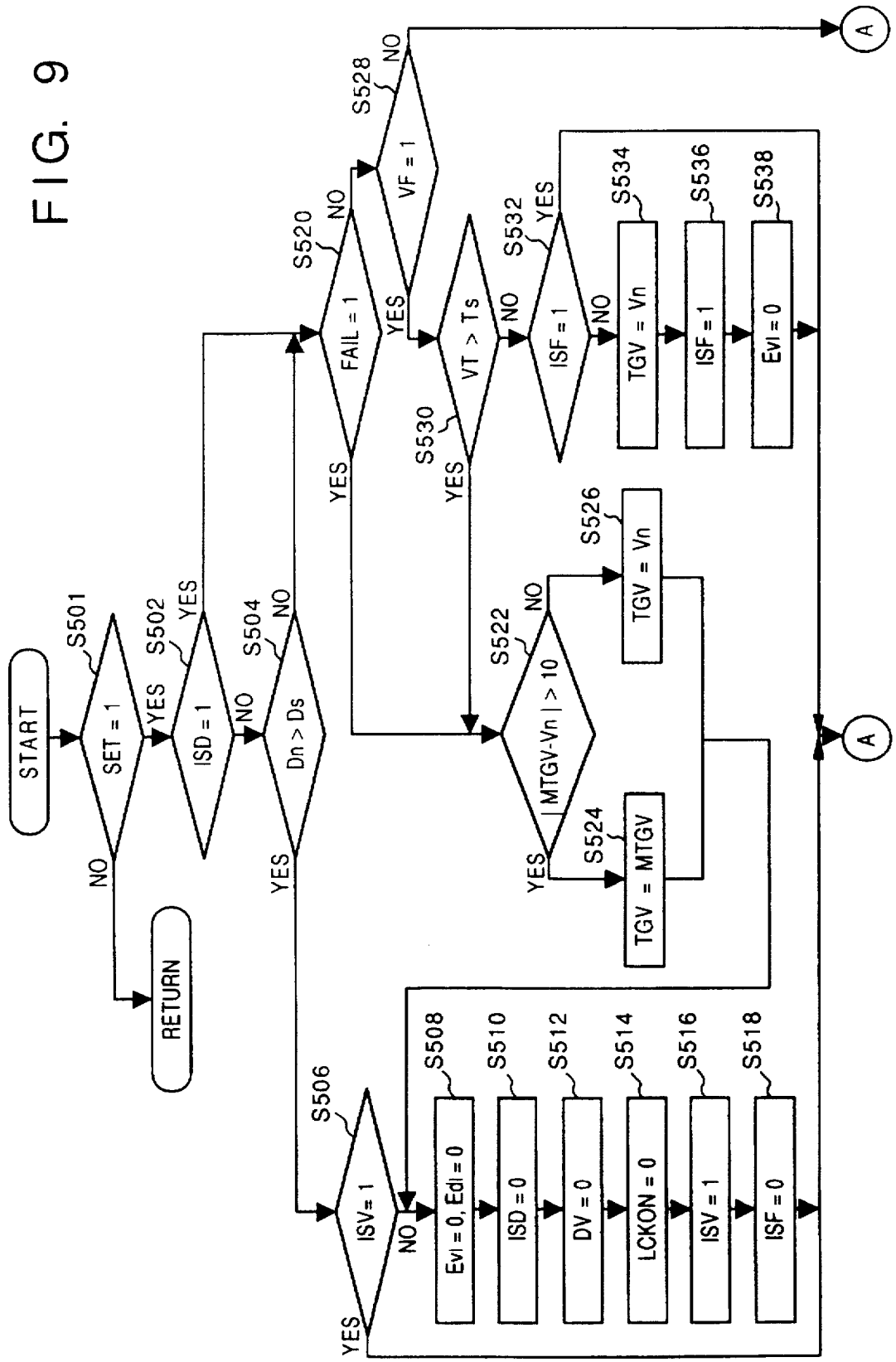
FIG. 9 is a flow chart showing the feedback control sequence of the embodiment shown in FIG. 1.
Figure 10:
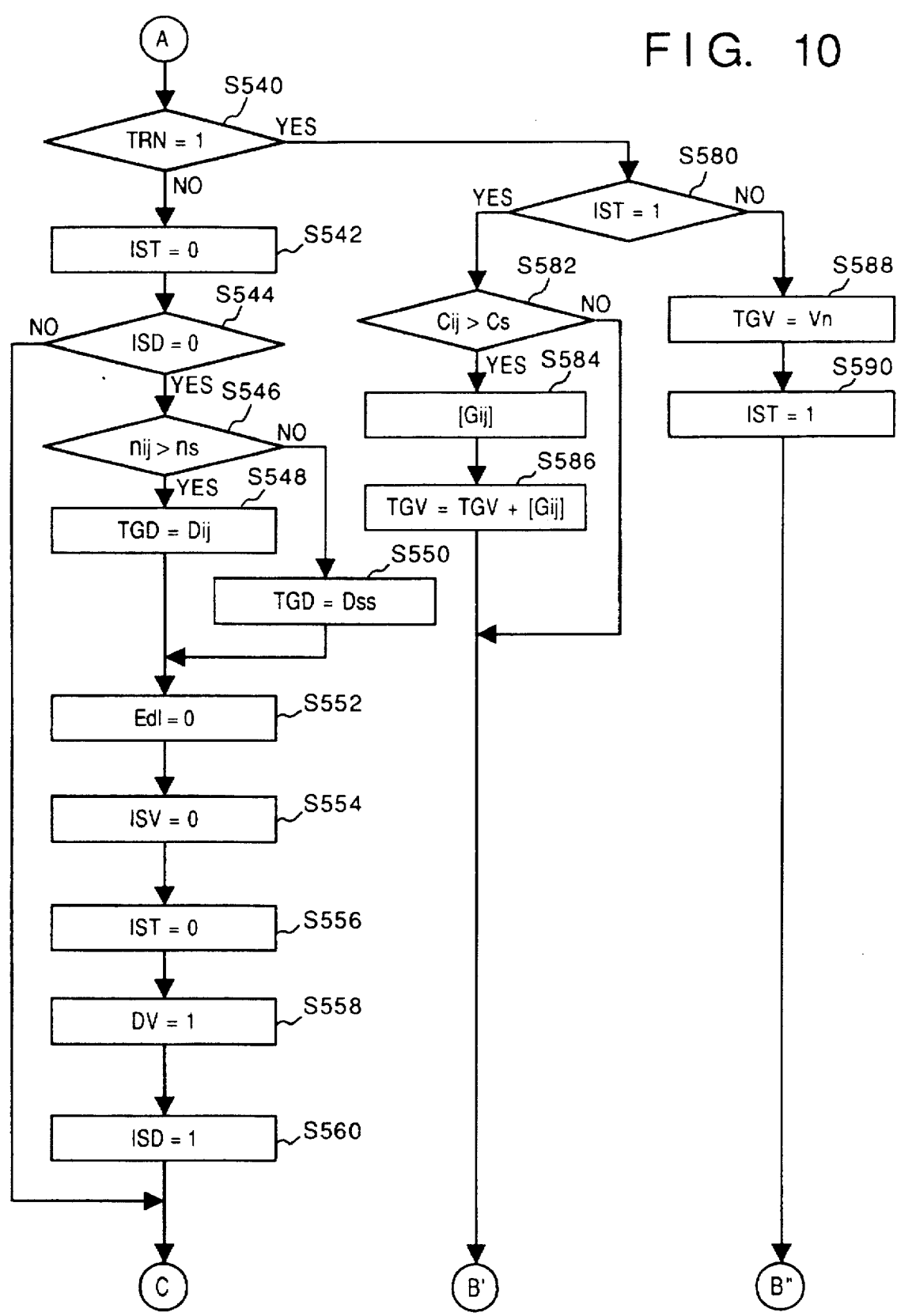
FIG. 10 is a flow chart showing the feedback control sequence of the embodiment shown in FIG. 1.
Figure 11:
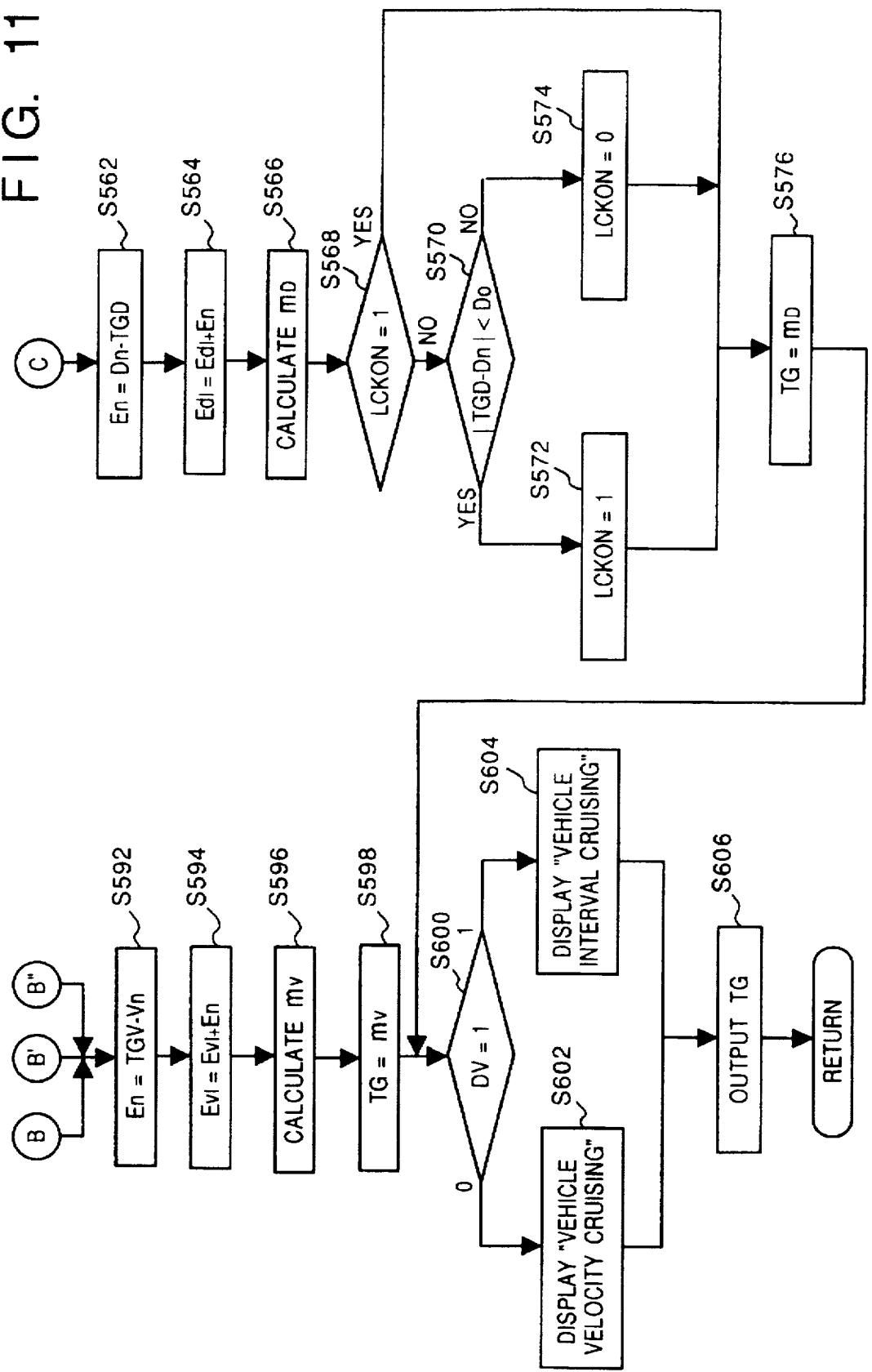
FIG. 11 is a flow chart showing the feedback control sequence of the embodiment shown in FIG. 1.

Even after the SET switch is released, since the flag SET has already been set in step S106, the control sequence advances, in turn, to step S104→step S140→step S142→step S144→step S146→step S152→step S154. The control to be executed when the flag SET is set is executed according to the control sequence shown in the flow charts of FIGS. 9 to 11 showing "feedback control".

When RESUME Switch is ON

A case will be described below wherein the RESUME switch is depressed.

In this case, the flow advances, in turn, to step S101 (FIG. 3)→step S102→step S104→step S140→step S172 (FIG. 5)→step S176, and the flag RESUME is set in step S176. A throttle opening degree TG which can obtain a predetermined acceleration a with respect to the current vehicle speed $V_n$ is determined in step S184, and the determined TG is output to the actuator 43 in step S122.

Once the flag RESUME is set, even after the RESUME switch is turned off, the flow advances, in turn, to step S172→step S180→step S178→. . . →step S184→step S186. Then, this operation is continued until it is determined in step S182 that the vehicle speed falls within a range of ±3 km/h from the target vehicle speed TGV (in the case of the S-type F/B control) or until it is determined in step S190 that the vehicle-interval distance falls within a range of ±1 m from the target vehicle-interval distance TGD (in the case of the D-type F/B control). More specifically, the acceleration or deceleration is performed until the vehicle-interval distance is resumed to the target vehicle-interval distance TGD stored in step S138 in the case of the D-type F/B control (YES in step S180), or until the vehicle speed is resumed to the target vehicle speed TGV set in step S134 in the case of the S-type F/B control (NO in step S180).

While the flag RESUME is set (i.e., while the vehicle speed or vehicle-interval distance is being resumed to the target vehicle speed or target vehicle-interval distance, when the vehicle speed or vehicle-interval distance becomes close to the target vehicle speed (step S182) or target vehicle-interval distance (step S190), the flag RESUME is reset and the flag SET is set in step S187. If the flag SET is set, the throttle opening degree is then controlled in accordance with the feedback control shown in FIGS. 9 to 11.

In step S192, it is checked if the auto-cruise system operator's own vehicle becomes too close to the vehicle ahead beyond the target vehicle-interval distance in the D-type F/B control during the RESUME operation. In this embodiment, it is checked if the following relation is satisfied:

$$D_n < TGD - 1 \quad (1)$$

More specifically, when the actual vehicle-interval distance $D_n$ becomes smaller than the target vehicle-interval distance TGD by 1 m or more, the throttle opening degree is decreased in step S194 to decelerate the vehicle.

When COAST Switch is ON

When the COAST switch is turned on during the auto-cruise control, the vehicle is decelerated. More specifically, if it is detected in step S154 that the COAST switch is ON during the auto-cruise control, the target throttle opening degree TG is set to be 0 in step S156, and the TG is output to the actuator 43 in step S122 to decelerate the vehicle. In order to set the vehicle speed or vehicle-interval distance at the time of depression of the COAST switch to be the target vehicle speed TGV or the target vehicle-interval distance TGD in future S-type F/B control or D-type F/B control, the vehicle speed $V_n$ or the vehicle-interval distance $D_n$ is saved in the register TGV or TGD (step S162 or S160).

<S-type F/B control>

In this system, when the driver depresses the SET switch, the flag SET is set (step S106), and auto-cruise control is executed according to the S-type F/B control which uses the vehicle speed at that time to be the target vehicle speed (step S134). More specifically, the S-type F/B control is default control. The reason why the S-type F/B control is a default one is that both the flag DV and a flag LCKON are reset in initialization processing in step S170. On the other hand, when the driver depresses the RESUME switch, acceleration or deceleration is performed toward the previously set target vehicle speed (step S184). After the vehicle speed has reached the target vehicle speed (YES in step S182), the flag SET is set in step S187 to execute the S-type F/B control. More specifically, even when the auto-cruise control is started by depressing the RESUME switch, after the vehicle speed has reached the target vehicle speed, the S-type F/B control is executed in the same manner as in a case wherein the auto-cruise control is started by depressing the SET switch.

Figure 12:
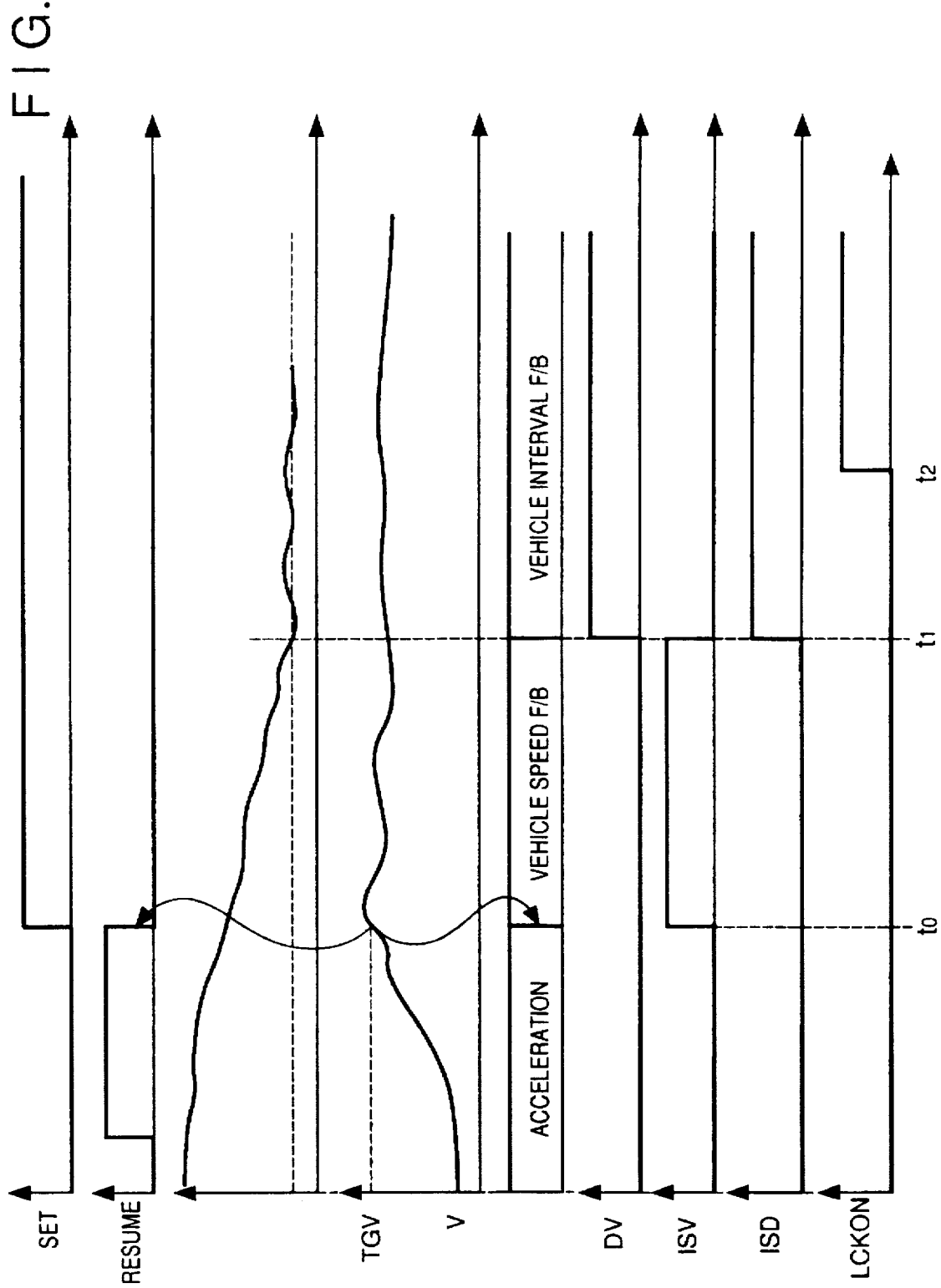
FIG. 12 is a timing chart for explaining the operation when vehicle-speed based F/B control is switched to vehicle-interval distance based F/B control according to the control sequence shown in FIGS. 9 to 11.

FIG. 12 shows the progress of the control wherein the flag RESUME is set, a vehicle speed V increases (acceleration), the flag SET is set (S-type F/B control operation) since the vehicle speed V has reached the target vehicle speed TGV, thereafter, the vehicle-interval distance to the vehicle ahead is decreased, and the flag DV is set.

The S-type F/B control will be described below with reference to the flow charts in FIGS. 9 to 11.

The flow charts in FIGS. 9 to 11 include both the S-type F/B control and the D-type F/B control. An arithmetic operation for the S-type F/B control is performed in step S596, and an arithmetic operation for the D-type F/B control is performed in step S566. The S-type F/B control will be explained first, conditions for shifting the control from the S-type F/B control to the D-type F/B control will then be explained, and thereafter, the D-type F/B control will be explained.

Execution of S-type F/B control

The target throttle opening degree TG in the S-type F/B control is defined by:

$$TG = K_{vI} \times E_{vI} \quad (2)$$

$$+ K_{vP} \times E_n \quad (3)$$

$$- K_{vP}(V_{n-1} - V_n) \quad (4)$$

where $K_{vI}$ and $K_{vP}$ are control constants, and $E_n$ is calculated by:

$$E_n = TGV - V_n \quad (5)$$

Also, $E_{vI}$ is the integral value of $E_n$ calculated by:

$$E_{vI} = E_{vI} + E_n \quad (6)$$

Term (2) is for integral control, and has an effect of stabilizing feedback control. Term (3) is for proportional control, and term (4) is for differentiation control. Both of these terms have an effect of allowing quick convergence to a target value. Terms (2) to (4) are calculated in steps S596 and S598.

Referring back to FIG. 9, it is checked in step S501 if the flag SET is set. If NO in step S501, no processing is executed in the flow charts in FIGS. 9 to 11. More specifically, either the S-type F/B control or the D-type F/B control is started only when the flag SET is set.

A case will be described below wherein the flag SET is set.

In step S502, a flag ISD is checked. The flag ISD is set when the control enters the D-type F/B control mode for the first time, and is reset while the S-type F/B control is executed. Therefore, the control advances to step S504. In step S504, it is checked if the current vehicle-interval distance $D_n$ to the vehicle ahead has become close to a distance $D_s$ allowing execution of the D-type F/B control. After the auto-cruise control is started, the following relation will be kept for a while (YES in step S504):

$$D_n > D_s \qquad (7)$$

Therefore, the flow advances to step S506. In step S506, a flag ISV is checked. The flag ISV is set when the control enters the S-type F/B control mode for the first time, and hence, the control advances from step S506 to step S508. More specifically, every time the control enters the S-type F/B control mode for the first time, steps S508 to S518 are executed.

In step S508, the integral value $E_{vI}$ in term (2) and an integral value $E_{dI}$ (to be described later) for the D-type F/B control are initialized to zero. In steps S510, S512, and S518, the flags ISD, DV, and ISF are respectively reset. In step S516, the flag ISV is set to be 1 to memorize that the control has just entered the S-type F/B control mode. The flow then advances to step S592 (FIG. 11).

The deviation between the vehicle speed $V_n$ and the target vehicle speed TGV is calculated according to equation (5) in step S592, the integral variable $E_{vI}$ is calculated according to equation (6) in step S594, and a target throttle opening degree is calculated according to terms (2) to (4) in steps S596 and S598. In step S602, an information message indicating that the vehicle is currently traveling in the S-type F/B control mode is displayed for the driver. In step S606, the target throttle opening degree TG is output to the actuator 43.

Figure 13:
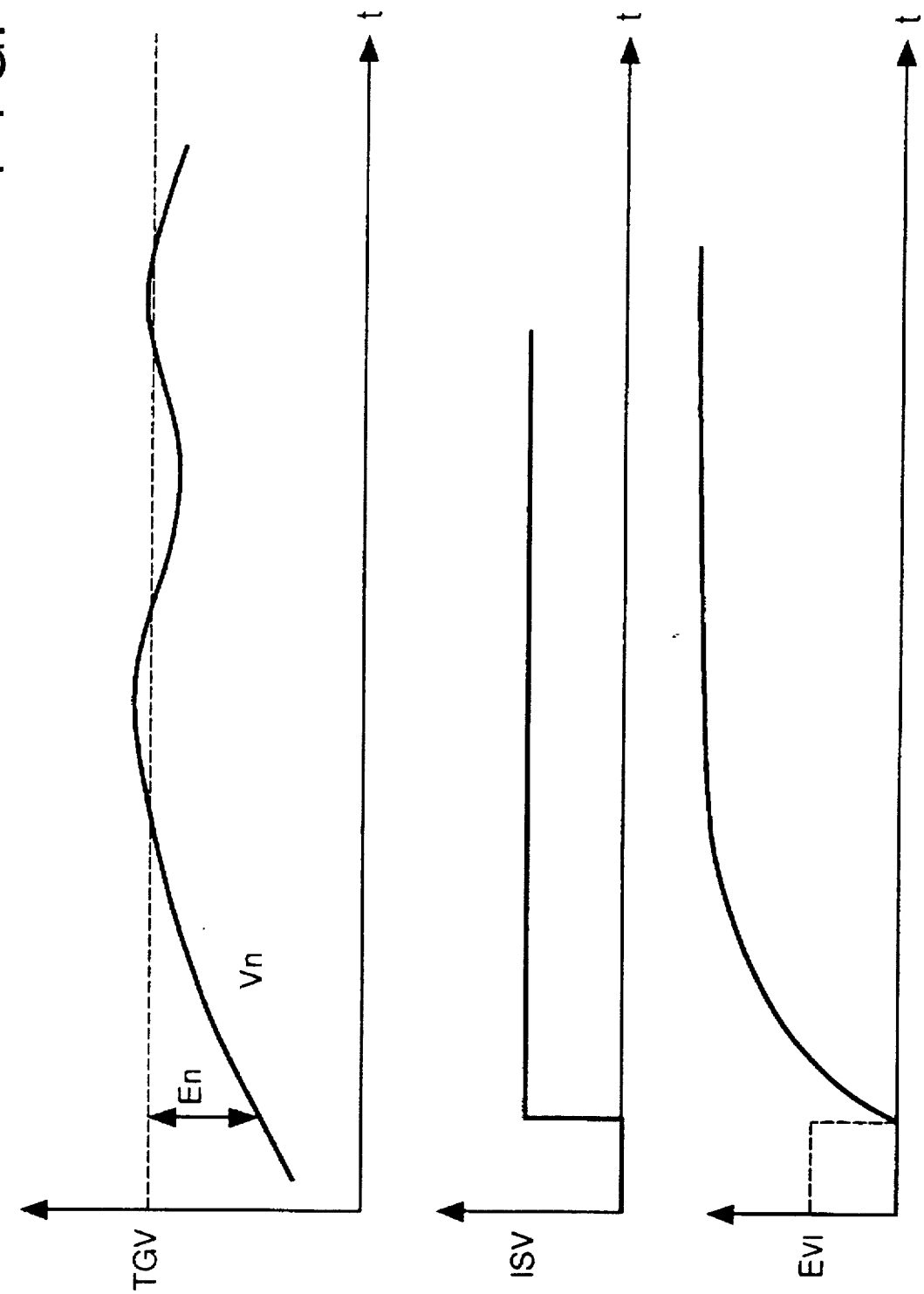
FIG. 13 is a timing chart for explaining a change in controlled variable $E_n$ and a change in integral variable $E_{vI}$ in the vehicle-speed based F/B control according to the control sequence shown in FIGS. 9 to 11.

Once the flag ISV is set, since YES is determined in step S506 as long as the vehicle-interval distance $D_n$ to the vehicle ahead exceeds the distance $D_s$ (allowing the D-type F/B control) ($D_n > D_s$), the integral variable $E_{vI}$ accumulates the deviations of $D_n$ from the target vehicle speed TGV (step S594). FIG. 13 shows a state wherein the vehicle speed $V_n$ becomes close to the target vehicle speed TGV, and converges to TGV. More specifically, while the vehicle speed $V_n$ is smaller than the target value TGV, the integral variable $E_{vI}$ increases. However, when the vehicle speed $V_n$ converges to the target value TGV, the integral variable $E_{vI}$ also converges to a constant value.

Shift to D-type F/B control

If the target vehicle speed TGV is higher than the vehicle speed of the vehicle ahead, the auto-cruise system operator's own vehicle eventually catches up the vehicle ahead. In this state, NO is determined in step S504, and the flow advances to step S520.

After it is confirmed in steps S520 and S528 that the function of the vehicle-interval distance sensor is not deteriorated (FAIL=0) and the sight of the vehicle ahead is not missing due to a pitch motion of the auto-cruise system operator's own vehicle (VF=0), the flow advances to step S540 (FIG. 10) to check if the vehicle is turning (flag TRN=1). For the sake of simplicity, assume that the auto-cruise system operator's own vehicle travels straight. Then, the control advances to step S542.

In step S542, a flag IST is reset. Since this flag IST indicates the beginning of the turning operation, it is reset during the straight traveling operation. In step S544, a flag ISD is checked. This flag indicates that the control mode is shifted from the S-type F/B control to the D-type F/B control. Therefore, since the flag ISD is now reset because the vehicle-interval distance currently falls within a distance range allowing the D-type F/B control, the control advances to step S546. In steps S546 to S560, since the control enters the D-type F/B control, a target vehicle-interval distance TGD is set, and the integral variable $E_{dI}$ is initialized.

More specifically, it is checked in step S546 how many times the target vehicle-interval distance TGD was learned previously. The learning will be described later. In this case, the number $n_{ij}$ of times of learning is small and is assumed to be:

$$n_{ij} \leq n_s \qquad (8)$$

where $n_s$ is a predetermined constant representing the number of times of learning determined by experiences. The flow then advances from step S546 to step S550, and the target vehicle-interval distance TGD is set to be a distance $D_{ss}$ which is determined by experiences. In step S552, $E_{dI}$ is reset to 0 to reflect, to the control, the fact that the control has newly entered the D-type F/B control. In steps S554 and S556, the flags IST and ISV are reset. In step S558, the flag DV is set to be 1 to memorize that the control is shifted to the D-type F/B control. In step S560, the flag ISD is set to be 1 to memorize that initialization (step S552) for starting the D-type F/B control has ended. In steps S562 to S566, an arithmetic operation for the D-type F/B control is performed.

The target throttle opening degree TG in the D-type F/B control mode is defined by:

$$TG = K_{dI} \times E_{dI} \qquad (10)$$

$$+ K_{dP} \times E_n \qquad (11)$$

$$- K_{dD}(D_{n-1} - D_n) \qquad (12)$$

where $K_{dI}$ and $K_{dD}$ are control constants and $E_n$ and $E_{dI}$ are defined by:

$$E_n = TGD - D_n \qquad (13)$$

$$E_{dI} = E_{dI} + E_n \qquad (14)$$

As in the S-type F/B control, term (10) is the integral control term, and has an effect of stabilizing feedback control. Term (11) is the proportional control term, and has an effect of allowing quick convergence to a target value. Term (12) is for differentiation control.

In steps S568 to S574, it is checked if the vehicle ahead as a target is locked on within a range of the target vehicle-interval distance. More specifically, the status of the flag LCKON indicating that the vehicle ahead is locked on is checked in step S568. If the flag LCKON has already been set, the flow advances to step S576; otherwise, it is checked in step S570 if the actual vehicle-interval distance $D_n$ has become close to the target vehicle-interval distance TGD. More specifically, if the following relation is satisfied, it is determined that the actual vehicle-interval distance $D_n$ has become close to the target vehicle-interval distance TGD:

$$|TGD - D_n| < D_0 \qquad (15)$$

where $D_0$ is a predetermined constant. Therefore, if YES is determined in step S570, the flag LCKON is set to be 1 in step S572; if NO is determined in step S570, the flag LCKON is reset to 0 in step S574. In step S576, the target throttle opening degree is set. In steps S600 and S604, a message is displayed for indicating that the D-type F/B control is being executed. In step S606, TG is output to the actuator 43.

In the timing chart shown in FIG. 12, the flag ISD is set at time $t_1$ at which $D_n > D_s$ is satisfied, and the flag LCKON is set at time $t_2$ at which $|TGD - D_n| < D_0$ ($D_0$ is a constant) is satisfied.

Once the flag ISD is set, the flow advances, in turn, to step S544→step S562→step S564, ... unless a turning operation is performed, and the D-type F/B control is executed.

<Vehicle-interval Distance That Matches Driver>

The meaning of step S548 executed in the D-type F/B control will be explained below.

A driver's "habit" is strongly reflected in setting of the vehicle-interval distance in the D-type F/B control. Some drivers set relatively large vehicle-interval distances, and some other drivers set relatively small vehicle-interval distances. As described above, in the system of this embodiment, the system sets the target vehicle-interval distance TGD to be a standard vehicle-interval distance $D_{ss}$ in step S550. However, it is desirable that the system automatically set vehicle-interval distance in correspondence with a driver's favor. Thus, in this system, in step S548, a vehicle-interval distance $[D_{ij}]$ set by another control sequence (FIGS. 14 and 15) used as target vehicle-interval distance TGD. How to set the vehicle-interval distance $[D_{ij}]$ will be described below with reference to the flow charts in FIGS. 14 and 15.

When the driver's favorite vehicle-interval distance does not coincide with the standard vehicle-interval distance $D_{ss}$ set by the system, this non-coincidence results in frequent canceling operations of the auto-cruise mode. This is because the control mode at the beginning of the auto-cruise control is the S-type F/B control in this system. Thereafter, when the vehicle-interval distance becomes close to the distance $D_s$ allowing the D-type F/B control, the control mode is shifted to the D-type F/B control, and the D-type F/B control is continued toward the standard vehicle-interval distance $D_{ss}$. Therefore, if the standard vehicle-interval distance $D_{ss}$ is too small for a certain driver, he or she depresses the brake pedal; if the distance $D_{ss}$ is too large for the driver, he or she depresses the accelerator pedal. The operation of the brake or accelerator pedal cancels the auto-cruise mode.

This system learns the driver's "habit" upon setting of the vehicle-interval distance in an acceleration state during straight traveling. The control sequence shown in the flow charts in FIGS. 14 and 15 is executed parallel to that shown in FIGS. 9 to 11. In the control sequence shown in FIG. 14, it is determined in step S902 that the current steering angle $\theta_n$ during straight traveling corresponds to a neutral position (=N). It is determined in step S904 that the flag TRN indicating that a turning operation is being executed is reset, and the flow then advances to step S916 (FIG. 15). In step S916, a flag ACC is checked to determine if an acceleration operation ($V_n > V_{n-1}$) is started. During cruising (NO in step S916), the flow advances, in turn, to step S916→step S940→step S930→step S934→step S936 so as to reset the acceleration flag ACC, to reset an acceleration timer ACCTMR, and to reset an acceleration accumulated distance $D_r$.

If it is detected in step S940 that the acceleration operation is started ($V_n > V_{n-1}$), the flag ACC is set in step S942 to memorize that the acceleration operation is started. The vehicle speed $V_n$ at the beginning of the acceleration operation is stored in a register VSPST in step S944, and the timer ACCTMR for storing the number of times of detection of the acceleration state is incremented by 1 in step S946. In step S948, the vehicle-interval distance $D_n$ is added to the contents of the register $D_r$. More specifically, in step S948, the following calculation is made:

$$D_r = D_r + D_n \tag{16}$$

The register $D_r$ accumulates the vehicle-interval distance after the acceleration operation is started.

Once the acceleration flag ACC is set, the flow advances, in turn, to step S902 (FIG. 14)→step S904→step S916 (FIG. 15)→step S918→step S946→step S948 as long as the vehicle speed does not decrease ($V_n > V_{n-1}$). Thus, the timer ACCTMR is counted up, and the vehicle-interval distance is accumulated on the register $D_r$.

When the deceleration of the vehicle ($V_n \leq V_{n-1}$) is detected in step S918, the vehicle speed $V_n$ at that time is saved in a register VSPEND in step S920. The register VSPEND stores the vehicle speed at the end of the acceleration operation. In step S922, an average vehicle speed $V_m$ during an acceleration period is calculated as an average value of the vehicle speed VSPST at the beginning of the acceleration operation and the vehicle speed VSPEND at the end of the acceleration operation on the basis of the following equation:

$$V_m = (VSPST + VSPEND)/2 \tag{17}$$

In step S924, an average acceleration $G_m$ during the acceleration period is calculated as the difference between the vehicle speed VSPST at the beginning of the acceleration operation and the vehicle speed VSPEND at the end of the acceleration operation on the basis of the following equation:

$$G_m = (VSPEND - VSPST)/ACCTMR \tag{18}$$

In step S926, an average vehicle-interval distance $D_m$ during the acceleration period is calculated based on the following equation:

$$D_m = D_r/ACCTMR \tag{19}$$

In step S928, the vehicle-interval distance $D_m$ during the acceleration period is learned. The vehicle-interval distance which reflects the individuality of a driver varies depending on the vehicle speed and acceleration. In this system, a population for learning the vehicle-interval distance $D_m$ is changed in accordance with the average vehicle speed $V_m$ and the average acceleration $G_m$.

Figures 16, 17:
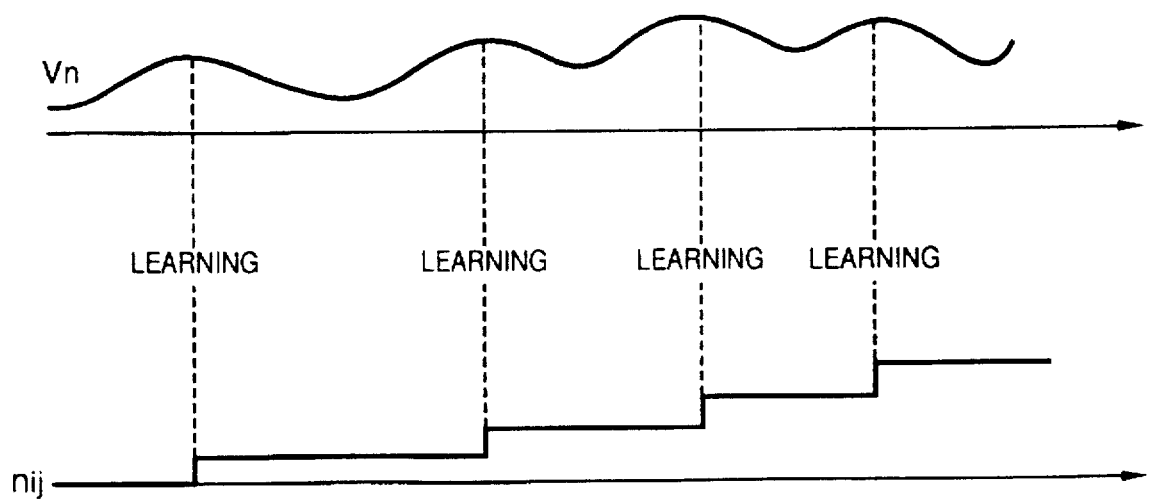
FIG. 16 is a table for explaining the principle of learning a vehicle-interval distance.
FIG. 17 is a graph for explaining the principle of learning a vehicle-interval distance.

FIG. 16 shows classification of populations for learning the vehicle-interval distance. More specifically, in this system, the acceleration $G_m$ is classified into two groups (large and small accelerations), and the vehicle speed $V_m$ is classified into two groups (high and low speeds). As shown in FIG. 16, the number $n_{ij}$ of samples and a learned average vehicle-interval distance $[D_{ij}]$ are learned for each of four populations, i.e., a population (represented by a suffix (1,1)) of the small acceleration $G_m$ and the low vehicle speed $V_m$, a population (represented by a suffix (1,2)) of the small acceleration $G_m$ and the high vehicle speed $V_m$, a population (represented by a suffix (2,1)) of the large acceleration $G_m$ and the low vehicle speed $V_m$, and a population (represented by a suffix (2,2)) of the large acceleration $G_m$ and the high vehicle speed $V_m$. More specifically, the number $n_{ij}$ of samples is learned according to the following equation in every period from the beginning to the end of the acceleration:

$$n_{ij}=n_{ij}+1 \tag{20}$$

The average vehicle-interval distance is learned according to the following equation:

$$[D_{ij}]=(D_{ij}+D_m)/n_{ij} \tag{21}$$

When the average vehicle-interval distance $[D_{ij}]$ is learned by changing the population in correspondence with the average vehicle speed $V_m$ and the average acceleration $G_m$, as described above, the learned distance $[D_{ij}]$ can reflect the driver's habit. FIG. 17 shows the concept of learning of the target vehicle-interval distance during the acceleration period. When the number $n_{ij}$ of times of learning becomes sufficiently large, since the learning accuracy can be improved, the target vehicle-interval distance $[D_{ij}]$ in step S548 in FIG. 10 is obtained by searching the table in FIG. 16 in accordance with the average vehicle speed and the average acceleration (which are the latest ones) stored in the registers $V_m$ and $G_m$ at that time. The vehicle-interval distance $[D_{ij}]$ is assumed to match the driver's "habit" most in correspondence with the average vehicle speed and the average acceleration at that time. When the D-type F/B control is executed to have such a vehicle-interval distance $[D_{ij}]$ as a target distance, smooth D-type F/B control can be automatically executed.

<Discrimination of Turning Operation>

In this auto-cruise system, when an environment allows the vehicle to simultaneously execute the S-type F/B control and the D-type F/B control, the D-type F/B control is preferentially executed. This is for the following reason. That is, as long as only the S-type F/B control is executed, the own vehicle approaches the vehicle ahead soon, and a cumbersome operation for changing the setting speed is required. Thus, in this embodiment, as described above, when the vehicle-interval distance falls within a distance range allowing execution of the D-type F/B control during execution of the S-type F/B control, the control mode is shifted to the D-type F/B control. However, when the vehicle enters a curve during execution of the D-type F/B control, continuation of the D-type F/B control is not preferable since the vehicle-interval distance from the vehicle ahead at the entrance of the curve is forcibly maintained. Furthermore, on the curve, for example, a guard rail may be erroneously recognized as vehicle ahead with high probability, and it is further not preferable to execute the D-type F/B control based on the erroneously recognized vehicle-interval distance. Thus, in this system, when the vehicle enters a curve during the D-type F/B control, the control mode is switched to the S-type F/B control.

In the S-type F/B control during turning of the vehicle, the target vehicle speed is in question. The target vehicle speed during straight traveling of the vehicle is too high for a vehicle which is traveling on a curve. In this system, a speed VSPST at the entrance of the curve and a speed VSTEND at the exit of the curve are learned so as to automatically set a safety target vehicle speed matching with a driver's favor. More specifically, the vehicle speed $V_n$ at the entrance of the curve is determined to be a temporary target vehicle speed TGV, and thereafter, the target vehicle speed TGV is gradually decreased at an acceleration/deceleration $G_{ij}$ according to the previous learning result.

The discrimination principle of the turning operation in this system will be described first with reference to the flow charts in FIGS. 14 and 15, and a shift logic from the D-type F/B control to the S-type F/B control and the S-type F/B control operation during the turning operation will be described in turn.

Discrimination of Turning Operation

In step S902 in FIG. 14, whether or not the vehicle is about to turn is determined by detecting the steering angle $\theta_n$. If it is detected for the first time that the steering angle $\theta$ does not correspond to the neutral position, the flow advances to step S902→S960→step S962 to set the flag TRN indicating that a turning operation is being executed. The vehicle-interval distance $D_n$ at the entrance of the curve is stored in a register DST in step S964, and the vehicle speed $V_n$ at the entrance of the curve is stored in a register VSPST in step S966. In step S968, a timer TRNTMR indicating a turning time is incremented. Furthermore, in step S969, the current steering angle $\theta_n$ is stored in a maximum steering angle register MAXθ.

Once the flag TRN is set, it means that a turning operation is being executed unless the steering wheel position is returned to the neutral position ($\theta_n$=N). The maximum steering angle MAXθ is updated (step S972) by discriminating whether or not the steering angle $\theta_n$ is larger than the previously stored MAXθ (step S970) in step S902→step S960. In step S974, the turning time timer TRNTMR is incremented.

When it is confirmed that the steering angle position is returned to the neutral position, the flow advances to step S902→step S904→step S906 to calculate an average acceleration/deceleration G during turning:

$$G=(V_n-VSPST)/TRNTMR \tag{22}$$

where $V_n$ is the vehicle speed at the exit of the curve. Therefore, G in equation (22) represents an increase/decrease in vehicle speed during turning, and if G>0, it represents the acceleration; if G<0, it represents the deceleration.

Learning During Turning

In step S908, the average acceleration/deceleration $G_{ij}$ is learned. This learning will be described below.

Figures 18, 19:
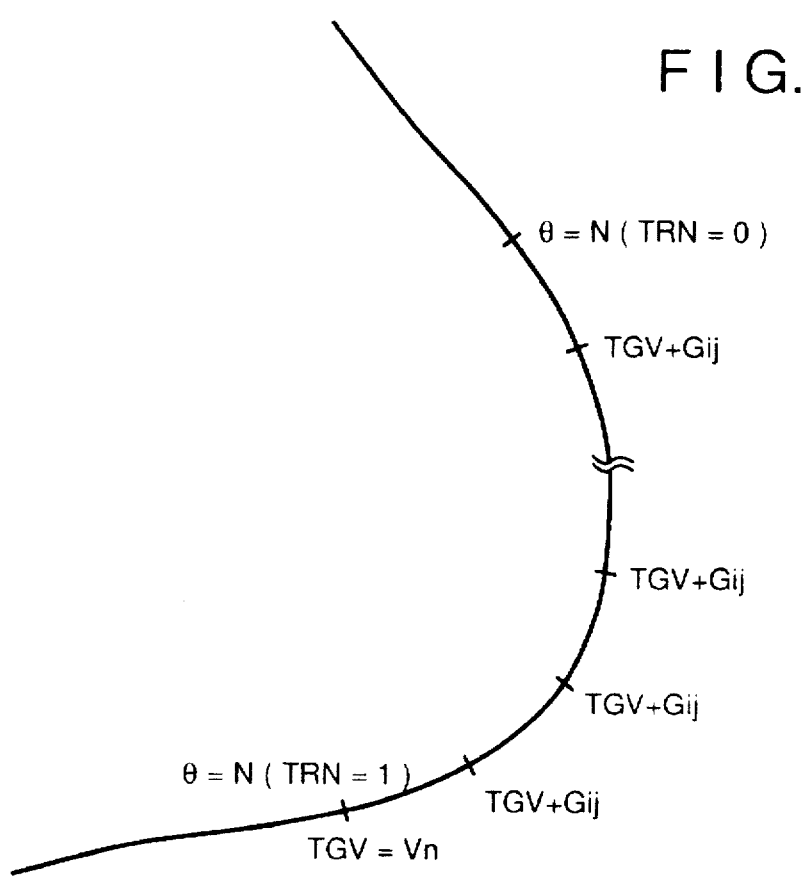
FIG. 18 is a chart for explaining the principle of learning a target vehicle speed upon turning of a vehicle.
FIG. 19 is a table for explaining the principle of learning a target vehicle speed upon turning of a vehicle.

The target vehicle speed TGV during turning of the vehicle should reflect the individuality of the driver. When the target vehicle speed is set to be the learned vehicle speed at the beginning of turning, the vehicle speed largely changes, thus disturbing smoothness. For this reason, as shown in FIG. 18, it is preferable that the actual vehicle speed $V_n$ at that time be set to be the target vehicle speed TGV at the beginning of turning (at the entrance of a curve), and thereafter, the vehicle speed be gradually decreased toward the target vehicle speed. This means that learning of the target acceleration/deceleration $[G_{ij}]$ is more preferable than learning of the target vehicle speed. This is because the driver's favor with respect to the acceleration/deceleration should change in accordance with the entrance vehicle speed $V_n$ at the entrance of a curve and the maximum steering angle. Thus, in this system, the population for learning the target acceleration/deceleration $G_{ij}$ is changed in accordance with the vehicle speed VSPST at the entrance of a curve and the maximum steering angle MAXθ during turning.

FIG. 19 shows classification of populations for learning the acceleration/deceleration G. More specifically, in this system, the maximum steering angle MAXθ is classified into two groups (large and small angles) and the vehicle speed VSPST at the entrance of a curve is classified into two groups (high and low speeds). As shown in FIG. 19, the number $c_{ij}$ of samples in each population and the acceleration/deceleration $[G_{ij}]$ are learned for each of four populations, i.e., a population (represented by a suffix (1,1)) of the small maximum steering angle MAXθ and the low entrance vehicle speed VSPST, a population (represented by a suffix (1,2)) of the small maximum steering angle MAXθ and the high entrance vehicle speed VSPST, a population (represented by a suffix (2,1)) of the large maximum steering angle MAXθ and the low entrance vehicle speed VSPST, and a population (represented by a suffix (2,2)) of the large maximum steering angle MAXθ and the high entrance vehicle speed VSPST. More specifically, upon passing each curve, the number $c_{ij}$ of samples is learned according to the following equation:

$$c_{ij} = c_{ij} + 1 \tag{23}$$

and the acceleration/deceleration is learned according to the following equation:

$$[G_{ij}] = (G_{ij} + G)/c_{ij} \tag{24}$$

When the acceleration/deceleration $[G_{ij}]$ is learned by changing the population in correspondence with the steering angle MAXθ and the entrance vehicle speed VSPST, the acceleration/deceleration $[G_{ij}]$ can reflect the driver's habit. When the number $c_{ij}$ of times of learning becomes sufficiently large, the learning accuracy can be improved.

S-type F/B control During Turning

Feedback control at the beginning of the turning operation during the D-type F/B control will be described below with reference to the control sequence shown in FIGS. 9 to 11.

When a turning operation is started during the D-type F/B control, since flag SET=1, flag ISD=1, flag FAIL=0, flag VF=0, and flag TRN=1, the control advances, in turn, to step S501→step S502→step S520→step S528→step S540→step S580. In step S580, a flag IST is checked. The flag IST is used for initially controlling to set the target vehicle speed to be the entrance vehicle speed $V_n$ when the vehicle traveling state changes from the straight traveling state performed so far to the turning traveling state. Therefore, since IST=0 now, the flow advances to step S588 to set the target vehicle speed TGV to be the entrance vehicle speed $V_n$:

$$TGV = V_n \tag{25}$$

In step S590 (FIG. 11), the flag IST is set to be 1. In steps S592 to S606, the S-type F/B control toward the target vehicle speed TGV is executed. Once the flag IST is set, the control advances to step S580→step S582, and the number $c_{ij}$ of times of learning is checked in step S582 to determine if learning has been sufficiently performed.

When the number of times of learning is small (NO in step S582), the S-type F/B control using the entrance vehicle speed as the target vehicle speed is executed. However, when the number of times of learning becomes sufficiently large ($c_{ij} > c_s$), the acceleration/deceleration $[G_{ij}]$ according to the maximum steering angle MAXθ and the entrance vehicle speed VSPST at that time is obtained by searching the table in FIG. 19. Then, the target vehicle speed TGV is decreased according to the following equation:

$$TGV = TGV + [G_{ij}] \tag{26}$$

The target vehicle speed TGV which is set, as described above, is to match the driver's "habit" most in accordance with the steering angle θ and the curve entrance vehicle speed at that time. The S-type F/B control using this target vehicle speed TGV can smoothly shift the auto-cruise control mode from the D-type F/B control to the S-type F/B control during an interval from the entrance to the exit of a curve. After the control mode is shifted, smooth S-type F/B control matching the driver's "habit" can be automatically executed.

<Control Upon Deterioration of Signal>

Discrimination of Missing of Vehicle-Interval Distance Signal

In the auto-cruise operation based on the D-type F/B control, it is important to detect the vehicle-interval distance from the vehicle ahead all the time. For this purpose, this system uses the radar sensor 10 (FIG. 1). However, since the vehicle body makes a pitch motion on an actual road, light or sonic wave radiated from the sensor is directed excessively upward or downward, and the radiated light (sonic wave) may not often reach the vehicle ahead or the wave reflected by the vehicle ahead may not often be returned to the sensor 10. Such sensor is weak against rain or dust. In this case, a signal is also missed. When the signal is missed, it is difficult to continue the D-type F/B control. Thus, in this system, when signal missing is detected during the D-type F/B control (the vehicle-interval distance signal missing flag VF=1, which flag indicates that the vehicle-interval distance signal is missed) or when a sign indicating deterioration of the sensor function is detected (flag FAIL=1), the control mode is switched from the D-type F/B control to the S-type F/B control as an auto-cruise mode which does not require any vehicle-interval distance signal.

The control sequence of signal missing discrimination will be described below with reference to FIG. 20. In this control sequence, when the vehicle-interval distance is measured to be an infinite distance, or when the deviation between the actual vehicle-interval distance and the target vehicle-interval distance TGD is measured to be an uncontrollable distance, a signal missing state (VF=1) is determined.

In step S202, the flag LCKON which indicates whether or not a target is locked on is checked. A condition required for setting this flag LCKON is to detect that the deviation between the target vehicle-interval distance TDG and the actual vehicle-interval distance $D_n$ is not large, i.e., the following relation is satisfied (step S572 in FIG. 11):

$$|TGD - D_n| < D_s \tag{27}$$

where the constant $D_s$ is the distance allowing this system to execute the D-type F/B control. Therefore, the flag LCKON indicates if the vehicle ahead is locked on within the target vehicle-interval distance.

When the vehicle-interval distance is not an infinite distance, it cannot be discriminated whether the signal is erroneous or normal. Thus, in the control sequence in FIG. 20, if the flag LCKON is not set (i.e., if the vehicle ahead is not locked on), missing discrimination is performed based on whether or not the distance signal indicates an infinite distance; if the flag LCKON is set (i.e., if the vehicle ahead is locked on), missing discrimination is performed based on the difference between the target vehicle-interval distance and the actual vehicle-interval distance.

A case will be explained below wherein the flag LCKON is 0, i.e., when the D-type F/B control is not performed. When the flag LCKON is 0, if the previously measured vehicle-interval distance $D_{n-1}$ does not indicate an infinite distance (NO in step S204) but the currently measured vehicle-interval distance $D_n$ indicates an infinite distance (YES in step S208), missing of the vehicle-interval distance signal is stored (VF=1) in step S210. On the contrary, when both the previously and currently measured vehicle-interval distances do not indicate an infinite distance, the flag VF is cleared in step S214.

As described above, a vehicle-interval distance signal D tends to include noise due to a pitch motion of the vehicle body. In other words, the vehicle-interval distance may often be erroneously measured. In view of this, it is unadvisable to immediately shift the control mode from the D-type F/B control to the S-type F/B control upon discriminating missing of a signal based on such a vehicle-interval distance signal including noise, and to continue the S-type F/B control. Thus, in this system, the number of times of missing of a signal is counted, and a control mode upon shifting from the D-type F/B control to the S-type F/B control is changed in accordance with the number of times of missing (step S528 in FIG. 9). A timer VT counts the number of times of missing.

A condition required for starting the count operation of the timer VT is a case wherein both the previously and currently measured vehicle-interval distances indicate an infinite distance (YES in steps S204 and S206), or a case wherein an infinite distance is detected in the current measurement for the first time (NO in step S204 and YES in step S208). A condition for clearing the timer VT and the flag VF is a case wherein the vehicle-interval distance signals obtained in two or more continuous measurements do not indicate an infinite distance. In other words, after it is detected that the vehicle-interval distance signal $D_n$ indicates an infinite distance for the first time, the timer VT continues its count operation as long as the vehicle-interval distance signal continuously indicates an infinite distance. When the signals obtained in two or more continuous measurements do not indicate an infinite distance, the timer VT and the flag VG are reset.

A case will be described below wherein the target lock-on flag LCKON is 1, i.e., the D-type F/B control is being executed. If it is determined that the difference between the target vehicle-interval distance TGD and the previous actual vehicle-interval distance $D_{n-1}$ is not large ($|TGD-D_{n-1}| \leq A$ is satisfied in step S218) but the difference from the currently measured vehicle-interval distance $D_n$ is large ($|TGD-D_{n-1}|>A$ is satisfied in step S222), missing of the vehicle-interval distance signal is stored in step S228 (VF=1). On the contrary, when both the differences from the previously and currently measured vehicle-interval distances are not large, the flag VF is reset in step S224. A condition required for the timer VT to start counting of the number of times of signal missing is a case wherein both the differences from the previously and currently measured vehicle-interval distances are large (YES in steps S218 and S232) or a case wherein a large difference from the vehicle-interval distance is detected in the current measurement for the first time (NO in step S218 and YES in step S222). A condition required for clearing both the timer VT and the flag VF is a case wherein large differences from the vehicle-interval distances are not detected in two or more continuous measurements.

Detection of Deterioration of Sensor Function

Figure 21:
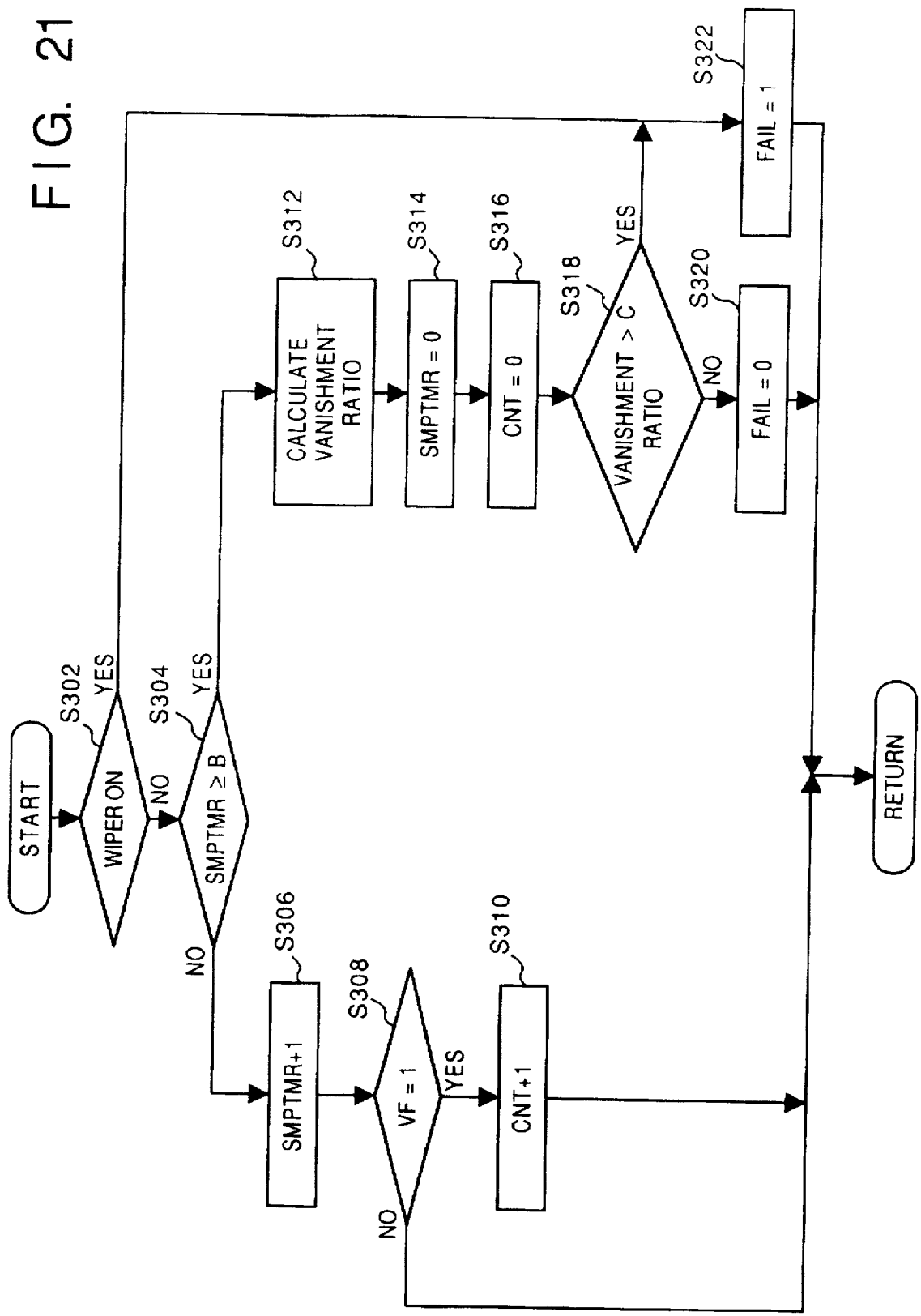
FIG. 21 is a flow chart showing the control sequence for detecting deterioration of performance of a distance sensor.

A logic for detecting deterioration of the function of the sensor contaminated with, e.g., rain will be described below with reference to FIG. 21.

In step S302, it is checked if the wiper 61 is active. If YES in step S302, since it is raining and it is certain that the sensor function has deteriorated, the flag FAIL is set in step S320.

In step S304 and subsequent steps, the ratio of the signal missing state (VF=1 in FIG. 20) of the sensor is discriminated when the wiper is not active. A timer SMPTMR in step S304 defines a time interval of the above-mentioned discrimination. More specifically, when the wiper is not active, the contents of the timer SMPTMR are counted up in step S306 to determine a sampling time. A time CNT during which the signal missing flag VF has been set is measured in step S310. After an elapse of the sampling time (B minutes) (YES in step S304), the ratio of signal missing per unit time (B minutes) is discriminated in step S312.

$$\text{Missing ratio} = CNT/B \qquad (28)$$

In steps S314 and S316, the counter CNT and the timer SMPTMR are reset to re-calculate the missing ratio. When the missing ratio exceeds C% (step S318), it is determined that the sensor function has deteriorated, and the flag FAIL is set to be 1 in step S320.

As described above, in this system, when the signal missing state is detected even for a short period of time due to, e.g., a pitch motion of the vehicle body, it is stored in the flag VF, and the corresponding missing time is stored in the vehicle-interval distance missing timer VT. When such missing states occur at a predetermined ratio or more, it is determined that the sensor function has deteriorated, and the deterioration of the sensor function is stored in the flag FAIL.

Operation of D-type F/B control

The influence of the above-mentioned signal missing state (VF=1) and the sensor deterioration state (FAIL=1) on the D-type F/B control of this system will be explained below with reference to the flow charts in FIGS. 9 to 11. According to the control sequence shown in these flow charts, if it is likely that the sensor signal is abnormal, the control mode is shifted from the D-type F/B control to the S-type F/B control. Then, slightly different control operations are executed upon shifting to the S-type F/B control depending on the duration of the signal missing time.

When it is determined that the sensor function has deteriorated, i.e., when the flag FAIL=1, the flow advances to step S520→step S522, and the current actual vehicle speed $V_n$ is compared with a set vehicle speed MTGV which is saved when the SET, RESUME, or COAST switch is turned on. If the two vehicle speeds have a difference of 10 km/h or more therebetween (YES in step S522), the set vehicle speed MTGV is set to be target vehicle speed in step S524.

$$TGV = MTGV \qquad (29)$$

On the other hand, if the two vehicle speeds do not have a difference of 10 km/h or more therebetween, the current vehicle speed is set to be the target vehicle speed in step S526.

$$TGV = V_n \qquad (30)$$

In step S508, the integral variable $E_{dI}$ for the D-type F/B control and the integral variable $E_{vI}$ for the S-type F/B control are reset. The flow then advances, in turn, to step S508→step S510→step S512→step S514→step S516→step S518 so as to set various flags for the S-type F/B control.

Even when no deterioration of the sensor is detected (NO in step S520), if the signal missing time VT is longer than the time $T_r$ (YES in step S530), the flow advances to step S522 to execute the same control as in a case wherein sensor deterioration is detected.

When the signal missing time is short, i.e., when $VT \leq T_r$ (NO in step S530), the flow advances to step S532. In step S532, a flag ISF is checked. The flag ISF indicates that the S-type F/B control is "temporarily" executed due to temporary signal missing. Therefore, NO is determined in step S532, the current vehicle speed $V_n$ is set to be the target vehicle speed TGV in step S534, and the flag ISF is set to be 1 in step S536. In step S538, in order to start the S-type F/B control, the integral variable $E_{vi}$ is reset to 0. In this case, the integral variable $E_{di}$ for the D-type F/B control is not reset.

The meaning of step S538 in which the integral variable $E_{di}$ for the D-type F/B control is not reset will be explained below.

If it is determined in step S530 that the missing time VT is shorter than $T_s$, it means temporary signal missing (signal missing due to, e.g., a pitch motion of the vehicle body). In this case, it is expected that the signal missing state will be recovered soon. Therefore, the time of the S-type F/B control due to the missing state will become short. If the system is recovered from the signal missing state for a short period of time, the control mode is preferably returned from the S-type F/B control to the D-type F/B control. If the control sequence is programmed to reset the integral variable $E_{di}$ for the D-type F/B control ($E_{di}$=0) even by signal missing for a short period of time (NO in step S530), even when the D-type F/B control is resumed within a short period of time, since the integral variable $E_{di}$ which had been accumulated during the previous D-type F/B control period has already been reset, continuity is lost due to transition of control modes like the D-type F/B control→the S-type F/B control→the D-type F/B control, resulting in jerky control. In this system, as described above, when signal missing occurs for a short period of time, the flow does not advance from step S532 to step S508, and the integral variable $E_{di}$ is not reset in step S538. Therefore, continuity of control can be assured, and smooth control can be expected when the control mode is returned from the S-type F/B control to the D-type F/B control.

Figure 22:
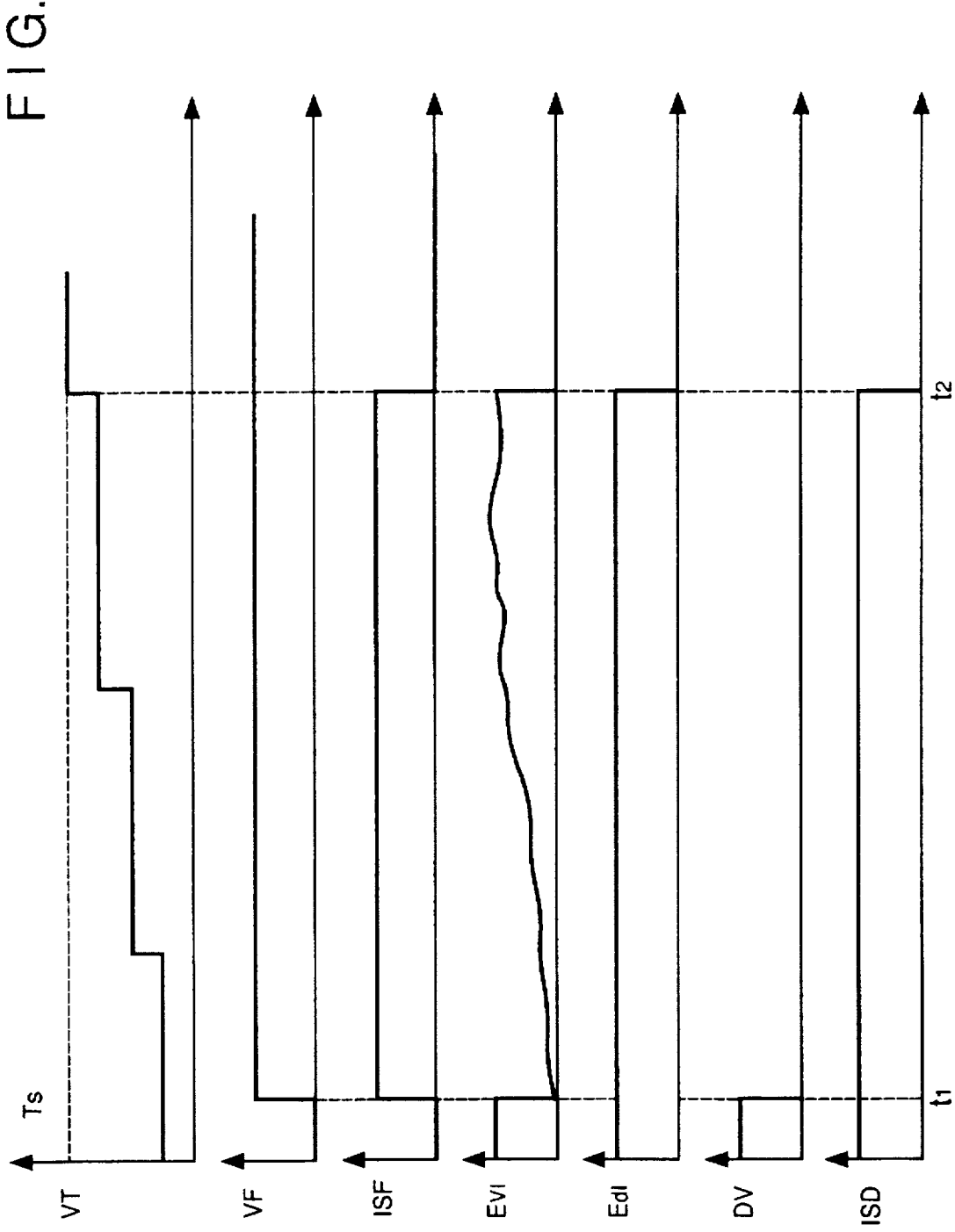
FIG. 22 is a timing chart for explaining transition from the vehicle-interval distance based F/B control to the vehicle-speed based F/B control upon missing of a signal.

A case wherein the signal missing time gradually increases will be described below with reference to FIG. 22. During execution of the D-type F/B control, when a signal missing state (for VT≤$T_s$) is detected at time $t_1$, the integral variable $E_{vi}$ for the S-type F/B control is reset, but the variable $E_{di}$ for the D-type F/B control is preserved. If the signal missing state continues, and VT=$T_s$ is satisfied at time $t_2$, as shown in FIG. 22, both the integral variable $E_{vi}$ for the S-type F/B control and the integral variable $E_{di}$ for the D-type F/B control are reset in step S508. Therefore, unlike in FIG. 22, if the signal missing state is canceled before time $t_2$, since the variable $E_{di}$ for the D-type F/B control is kept preserved, and the flag ISD is kept set, the flow advances to step S544→step S562, thus smoothly returning the control mode to the D-type F/B control.

<Effect of Embodiment>

According to the above-mentioned embodiment, the following effects are expected.

I: Since the "favor" and "habit" of a driver as regards to the vehicle-interval distance are learned in a curve traveling state or an acceleration state in which D-type F/B control is not executed (step S928 in FIG. 15), auto-cruise control can be realized based on the vehicle-interval distance $D_{ij}$ which does not make the driver uneasy.

I-1: Furthermore, since the target vehicle-interval distance $D_{ij}$ is learned in units of vehicle speed ranges (FIG. 16), the vehicle-interval distance $D_{ij}$ can be learned with high accuracy.

I-2: Since the target vehicle-interval distance $D_{ij}$ is learned in units of ranges of the acceleration/ deceleration G (FIG. 16), the vehicle-interval distance $D_{ij}$ can be set with high accuracy.

I-3: The number $n_{ij}$ of times of learning given by equation (20) is counted up every time an acceleration/ deceleration operation is performed. More specifically, frequent acceleration/deceleration operations increase the value of the number $n_{ij}$ of times of learning, and hence, decrease the learned vehicle-interval distance [$D_{ij}$] given by equation (21). When the acceleration/ deceleration operation is frequently performed, it can be determined that the driver wants to set a smaller vehicle-interval distance.

II: When the lock-on state of the vehicle ahead is lost upon traveling under the D-type F/B control (YES in step S528) or when it is determined that the accuracy of the vehicle-interval distance sensor has deteriorated (YES in step S520), the control mode can be smoothly shifted from the D-type F/B control performed so far to the S-type F/B control.

II-1: In particular, when the lock-on state of the vehicle ahead is lost during the D-type F/B control (YES in step S528) or when it is determined that the accuracy of the vehicle-interval distance based sensor has deteriorated (YES in step S520), the control mode is "temporarily" shifted to the S-type F/B control for time $T_s$ (NO in step S530). When the control mode is "temporarily" shifted to the S-type F/B control, the integral variable $E_{di}$ for the D-type F/B control performed so far is preserved (step S538). For this reason, when the signal missing state is recovered within a short period of time (NO in step S528), since the integral variable $E_{di}$ for the previous D-type F/B control is used, a "gap" between the previous D-type F/B control and D-type F/B control to be executed can be eliminated, and the control can be smoothly returned to the D-type F/B control.

II-2: Since the vehicle speed when the vehicle ahead becomes missing is set to be the target vehicle speed for the S-type F/B control in steps S526 and S534, a large variation in vehicle speed upon shifting from the D-type F/B control to the S-type F/B control can be eliminated.

II-3: If the missing state is not recovered after an elapse of a predetermined period of time in step S530, the flow returns to step S508 to reset both the integral variables $E_{di}$ and $E_{vi}$. When a long period of time has elapsed, a traveling environment may often change. Therefore, in order to maintain control reliability, it is not preferable to hold controlled variables for a long period of time.

III: In the above embodiment, the S-type F/B control is executed while the vehicle travels on a curve; otherwise, the D-type F/B control is executed (step S586 in FIG. 10). By using the acceleration/deceleration $G_{ij}$ which has been learned in the curve traveling states so far, the vehicle speed is controlled to reach the target vehicle speed TGV in the curve traveling state (step S586 in FIG. 10).

III-1: The acceleration/deceleration $G_{ij}$ is learned based on the vehicle speed VSPST at the entrance of a curve and the vehicle speed $V_n$ at the exit of the curve (step S906).

IV-1: The SET switch of this embodiment is used not only for setting the target vehicle speed (step S134 in FIG. 13) but also for setting the target vehicle-interval distance (step S138 in FIG. 13).

IV-2: When the SET switch is continuously depressed, not only the target vehicle speed can be continuously increased or decreased (step S118 in FIG. 4), but also the target vehicle-interval distance can be continuously decreased or increased (step S116 in FIG. 4). An increase (decrease) in target vehicle speed and a decrease (increase) in target vehicle-interval distance do not make a driver uneasy in operations.

<Modifications>

Various changes and modifications may be made within the spirit and scope of the invention.

First Modification . . . Smooth Control Shift

In the above-mentioned embodiment, when the vehicle ahead becomes missing during execution of the D-type F/B control, the control mode is shifted from the D-type F/B control to the S-type F/B control. However, when the missing time of the vehicle-interval distance signal is short, the integral variable $E_{vI}$ for the S-type F/B control is reset, but the integral variable $E_{dI}$ for the D-type F/B control, which variable has been accumulated during the D-type F/B control performed so far, is not reset since it is expected that the signal will be recovered within the short period of time (see step S538 in FIG. 9).

In the first modification to be described below, the holding operation of the integral variable is further developed, and the integral variable which has been calculated during the period of one control mode is taken over to the other control mode. A controlled variable m for the throttle opening degree TG in the first modification is defined as follows. More specifically, for the D-type F/B control, $$m = m + K_{dI} \times (D_n - TGD) + K_{dP} \times (D_n - D_{n-1}) - K_{dD} \times (2D_{n-2} - D_{n-1} - D_n) \quad (31)$$

For the S-type F/B control, $$m = m + K_{vI} \times (D_n - TGV_n) + K_{vP} \times \{(TGV_n - TGV_{n-1}) - (V_n - V_{n-1})\} - K_{vD} \times (V_n + V_{n-2} - 2V_{n-1}) \quad (32)$$

The variable m is common to equations (31) and (32). Therefore, when the control mode is shifted from the D-type F/B control to the S-type F/B control, the value of the integral variable m in the D-type F/B control is taken over to the S-type F/B control.

Figure 23:
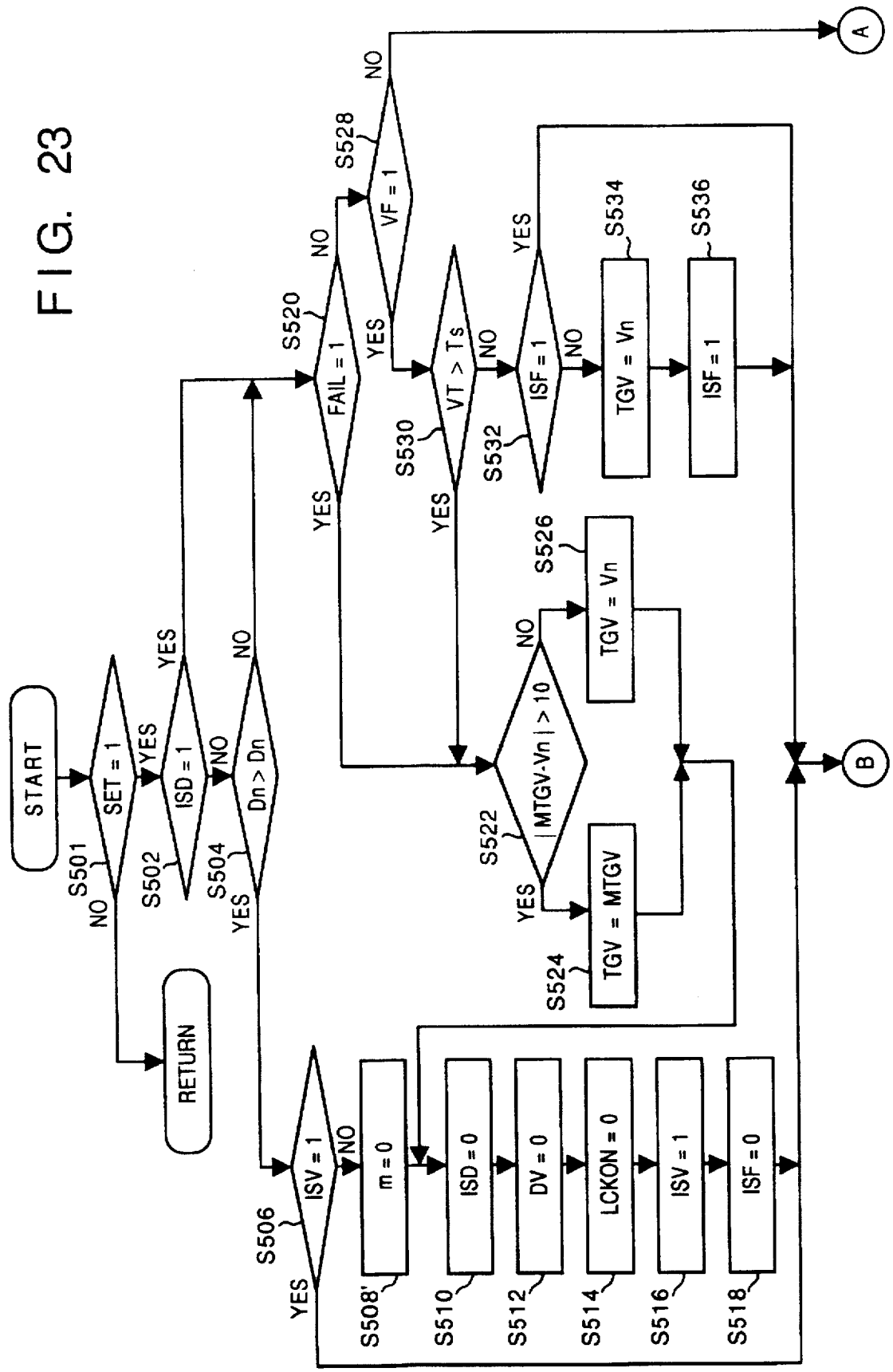
FIG. 23 is a flow chart showing the control sequence according to the first modification.
Figure 24:
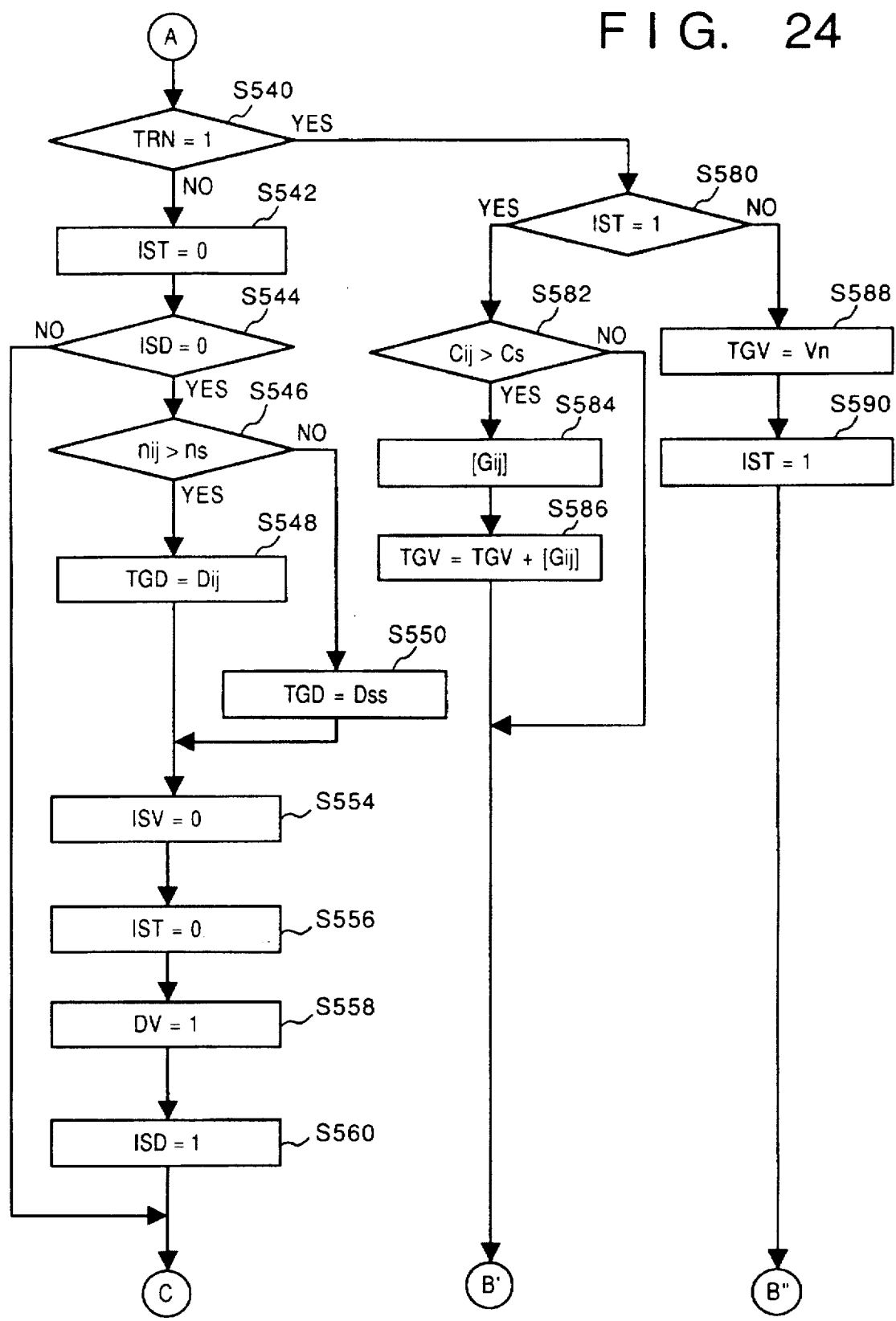
FIG. 24 is a flow chart showing the control sequence according to the first modification.
Figure 25:
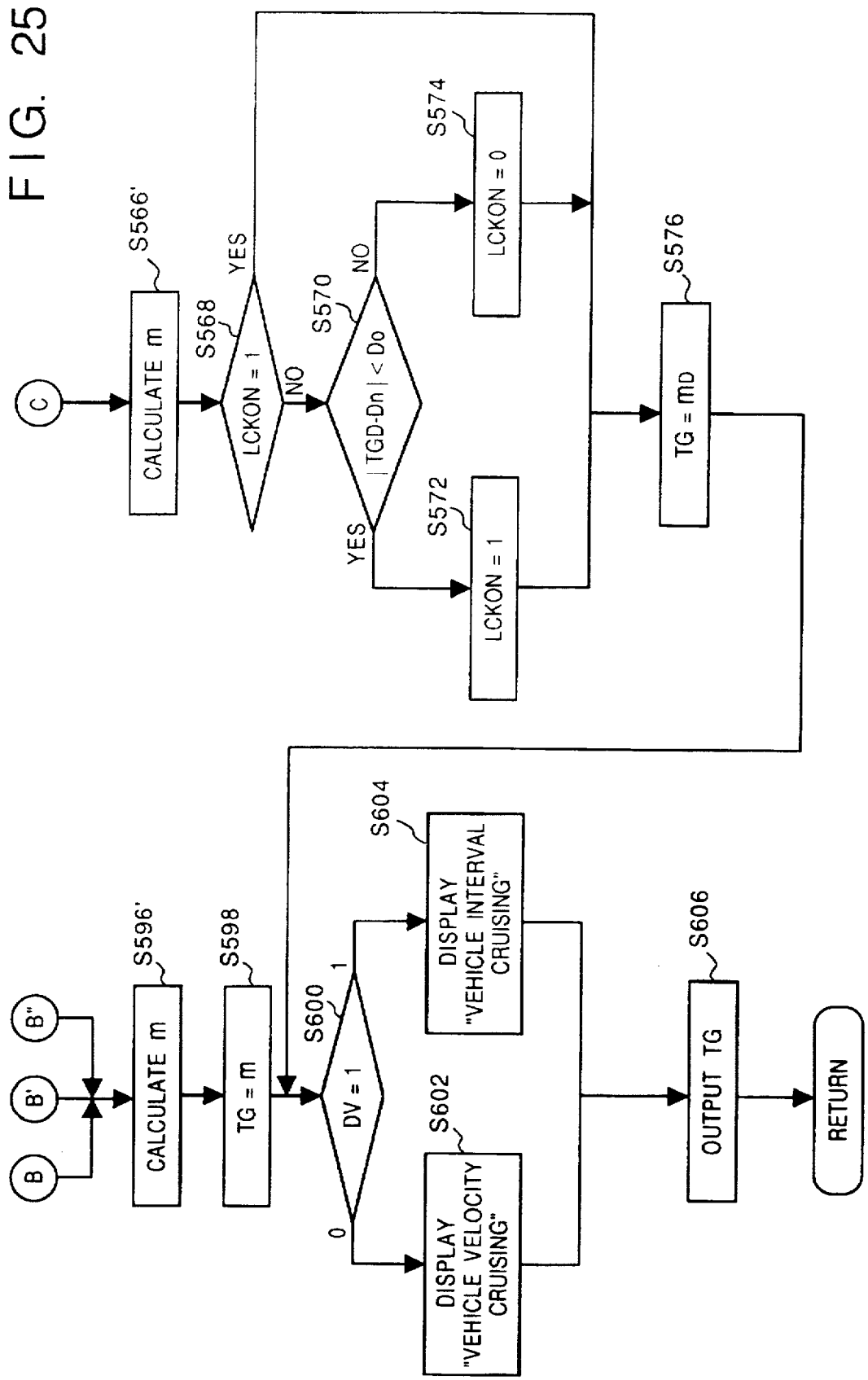
FIG. 25 is a flow chart showing the control sequence according to the first modification.

FIGS. 23 to 25 are flow charts showing the feedback control sequence in the first modification. The control sequence shown in FIGS. 23 to 25 is similar to that shown in FIGS. 9 to 11 in the above embodiment in many respects. However, in order to take over the integral value, as described above, step S536 in FIG. 9 and step S552 in FIG. 10 are omitted from the control sequence of the first modification. An arithmetic operation for the S-type F/B control based on equation (32) is performed in step S596' in FIG. 24, and an arithmetic operation for the D-type F/B control based on equation (31) is performed in step S566' (FIG. 25). Also, steps S592, S594, S562, and S564 in FIG. 11 are omitted.

Note that the control variable m is reset to 0 in step S508' (FIG. 23). When it is determined in step S504 that the vehicle is travelling at a distance which does not allow the D-type F/B control, and when the S-type F/B control is to be started, it is nonsense to take over the control variable m in the D-type F/B control performed so far. For this reason, when the vehicle-interval distance signal becomes missing, and the control mode is shifted from the D-type F/B control to the S-type F/B control, since the control variable m in the D-type F/B control should be taken over to the S-type F/B control, the flow advances from step S524 or S526 not to step S508' but to step S510 to prevent the value m from being cleared in FIG. 23 unlike in the control sequence in FIG. 9.

Effect of First Modification

According to the first modification described above, since the control variable m is taken over, the control mode can be smoothly switched between the S-type F/B control and the D-type F/B control, and a driver is free from feeling uneasy. In the above embodiment, the integral variable $E_{vI}$ is preserved in step S538 in FIG. 9 when the control mode is temporarily shifted to the S-type F/B control. In this modification, preservation is further positively made.

Second Modification . . . Learning of Driver's Habit

Figure 26:
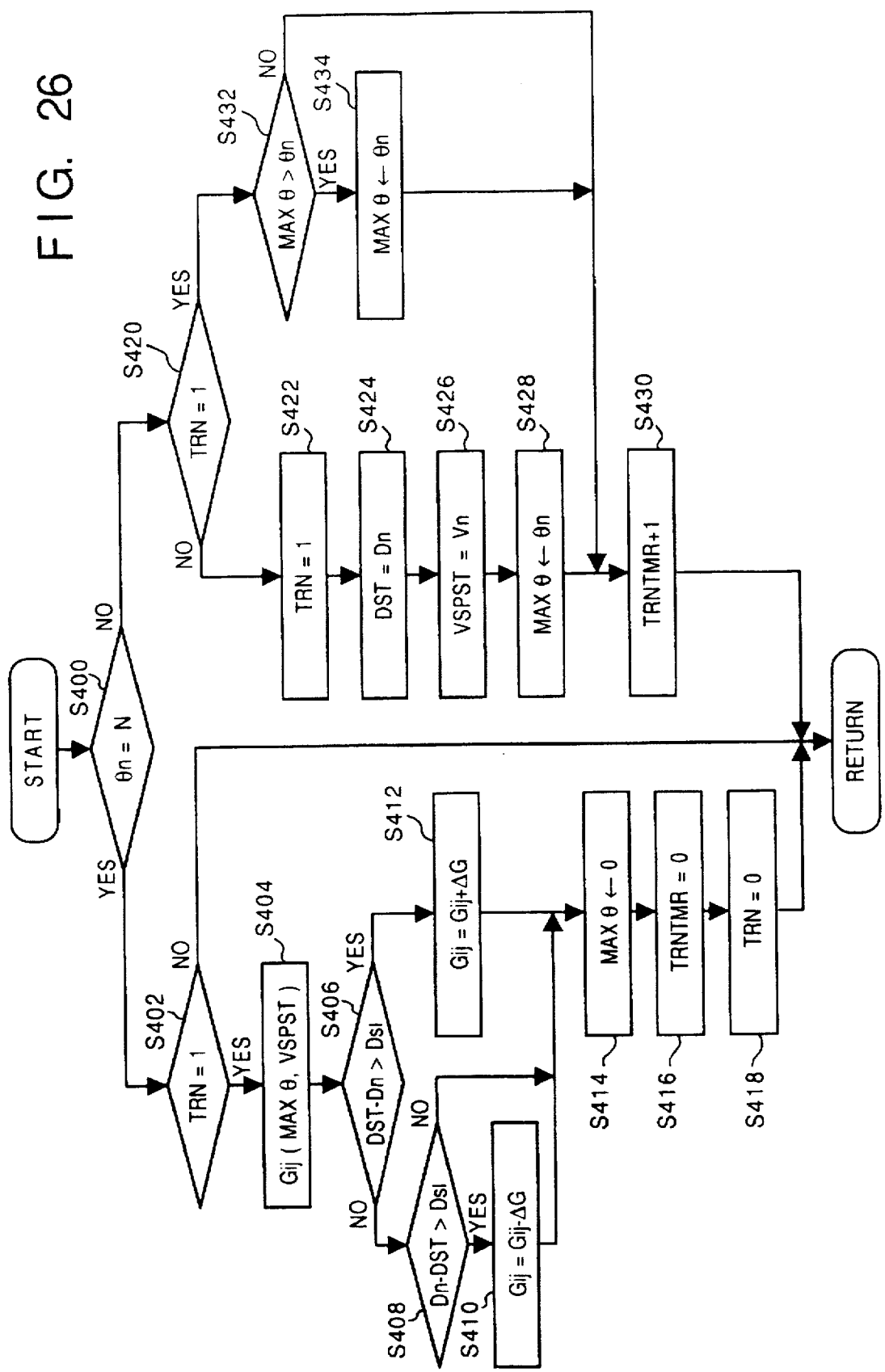
FIG. 26 is a flow chart showing the control sequence according to the second modification.

The second modification relates to the learning logic of the acceleration/deceleration upon turning of a vehicle, and its control sequence is shown in FIG. 26. Differences from the learning control sequence shown in FIGS. 14 and 15 are that a different learning method is adopted, and that no logic for learning a driver's "habit" associated with an acceleration in an acceleration state is programmed. Note that as for the flag TRN indicating that a turning operation is being executed, the timer TRNTMR for counting the turning time, the acceleration/deceleration $G_{ij}$, and the like, the same symbols as those in FIG. 14 and the like are used.

In step S400 in FIG. 26, it is checked if the steering angle position is the neutral position ($\theta_n = N$). When a turning operation is started, since $\theta_n \neq N$ is satisfied, the flow advances to step S420→step S422 to set the flag TRN. Furthermore, the vehicle-interval distance $D_n$ from the vehicle ahead at that time is saved in the register DST (step S424), the vehicle speed $V_n$ is saved in the register VSPST (step S426), and the steering angle $\theta_n$ is saved in the register MAX$\theta$ (step S428). In step S430, the timer TRNTMR for storing the turning time is counted up. Note that steps S432 and S434 correspond to an updating routine of the register MAX$\theta$.

As long as the position of the steering angle $\theta$ of the steering wheel is not returned the neutral position, the count-up operation of the timer TRNTMR is continued in step S430.

When the vehicle exits a curve or a corner, and the steering wheel is returned to the neutral position, acceleration/deceleration data $G_{ij}$ corresponding to the entrance vehicle speed VSPST and the maximum steering angle MAX$\theta$ during turning are searched and read out from those which have been learned so far, in step S404.

In steps S406 and S408, the vehicle-interval distance DST at the entrance of the curve and the vehicle-interval distance $D_n$ at the exit of the curve are compared with each other. If it is determined in step S406 that the following relation is satisfied ($D_{s1}$ is a positive constant):

$$DST - D_n > D_{s1} \quad (33)$$

that is, if the vehicle-interval distance at the exit of the curve becomes smaller than that at the entrance of the curve, it is determined that a driver has a "favor" (or a "habit") of keeping a small vehicle-interval distance, and the acceleration/deceleration is calculated as follows in step S412:

$$[G_{ij}] = [G_{ij}] + \Delta G \quad (34)$$

Since $\Delta G$ is a positive constant, equation (4) has a learning effect of increasing the acceleration/deceleration $[G_{ij}]$. On the other hand, if it is determined in step S408 that the following relation is satisfied:

$$DST - D_n < D_{s1} \quad (35)$$

that is, if the vehicle-interval distance at the exit of the curve becomes larger than that at the entrance of the curve, it is determined that a driver has a "favor" (or a "habit") of keeping a large vehicle-interval distance, and the acceleration/deceleration is calculated as follows in step S410:

$$[G_{ij}] = [G_{ij}] - \Delta G \quad (36)$$

The acceleration/deceleration [$G_{ij}$] given by equation (34) or (36) is used in determination of the target throttle opening degree (step S586) in FIG. 10, i.e., used in:

$$TGV=TGV+[G_{ij}]$$

Therefore, in the second modification as well, the target throttle opening degree is determined by reflecting the acceleration/deceleration [$G_{ij}$] which has been learned so far. In other words, in the second modification as well, since the throttle opening degree TGV which is increased or decreased in correspondence with [$G_{ij}$] is obtained by the control sequence shown in FIG. 10, the vehicle speed is controlled to increase or decrease in this manner in a curve traveling state, and consequently, the vehicle-interval distance is adjusted to match the driver's favor.

Effect of Second Modification

According to the control sequence shown in FIG. 26, since the counter $c_{ij}$ for counting the number of times of learning can be omitted from the control sequence shown in FIGS. 14 and 15, the control sequence can be simplified.

Third Modification . . . Discrimination of Cut-in Vehicle

The third modification is made to distinguish a case wherein another vehicle cuts in between the vehicle ahead and the own vehicle from a case wherein a road surface or a guard rail is erroneously determined to be the vehicle ahead, and to execute proper control in correspondence with these cases. The reason why such a discrimination error occurs will be explained below with reference to FIGS. 29 and 30.

Figure 29:
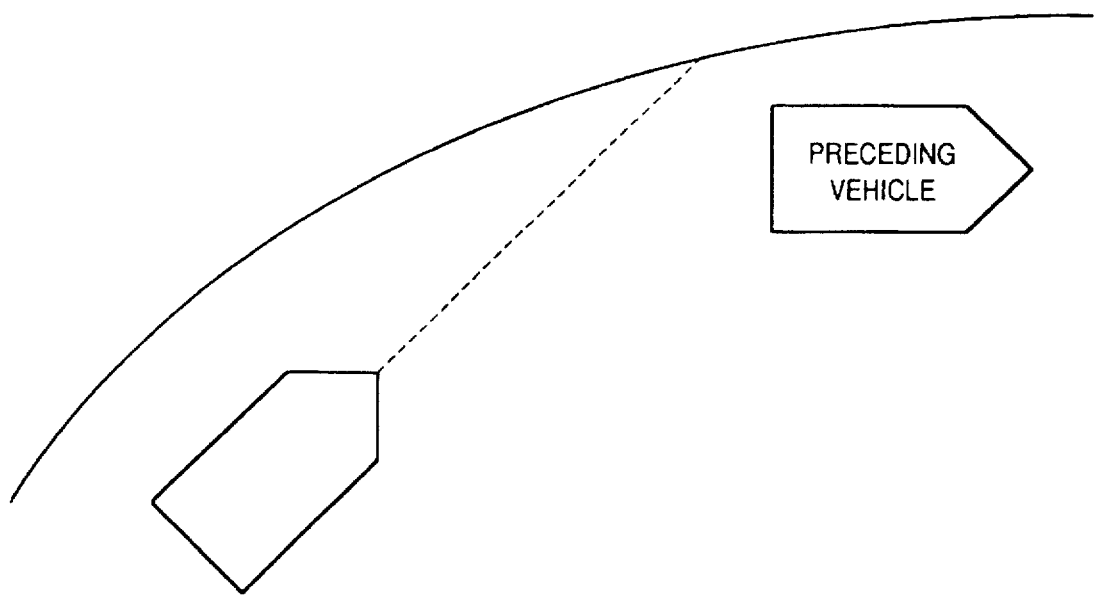
FIG. 29 is a view for explaining the reason why a cruise controller tends to miss a target upon traveling on a curve.
Figure 30:
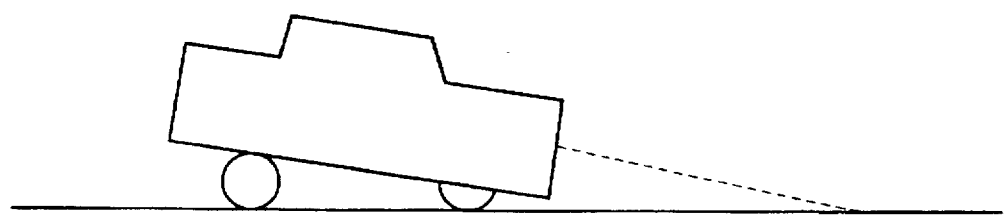
FIG. 30 is a view for explaining the reason why a cruise controller tends to miss a target when a vehicle body makes a pitch motion.

When a vehicle travels on a curve, as the curve is steeper, a guard rail appears ahead of the own vehicle for a longer period of time. Since the vehicle-interval distance sensor 10 uses a reflected wave, a wave reflected by the guard rail is erroneously detected as that from the vehicle ahead, as shown in FIG. 29. As shown in FIG. 30, when the vehicle body makes a pitch motion, a wave reflected by the road surface is erroneously detected as that from the vehicle ahead. Thus, in the third modification, when a state wherein the distance to the vehicle ahead (or an object ahead which is seemed to be a vehicle) measured by the sensor is smaller than the target vehicle-interval distance TGD continues over a predetermined period of time ($T_{ss}$), it is determined that the distance is not erroneously measured but another vehicle has cut in between the vehicle ahead and the own vehicle. In this case, the control mode is quickly shifted from the S-type F/B control to the D-type F/B control.

Figure 20:
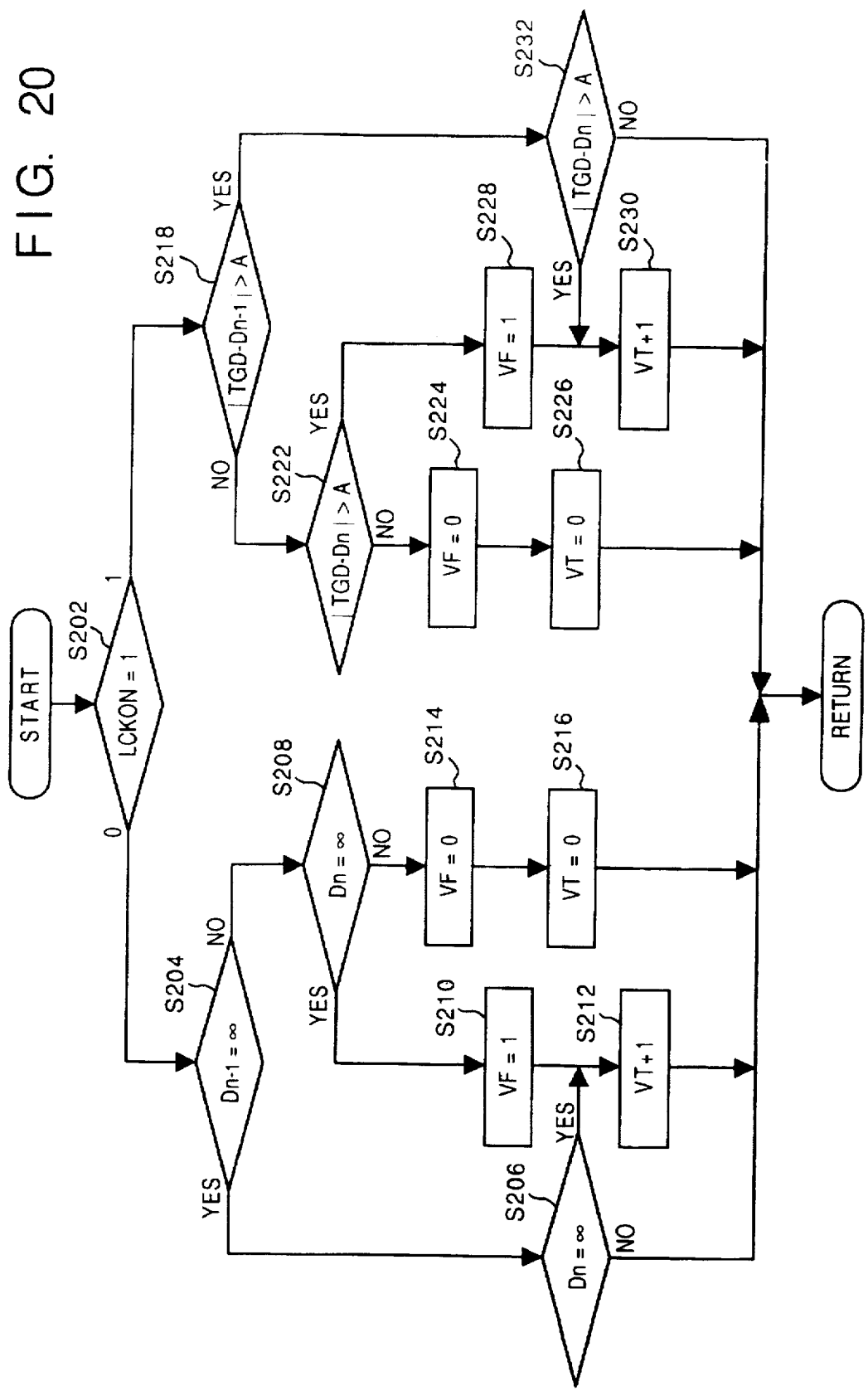
FIG. 20 is a flow chart showing the control sequence for detecting missing of a signal and of a vehicle ahead.
Figure 27:
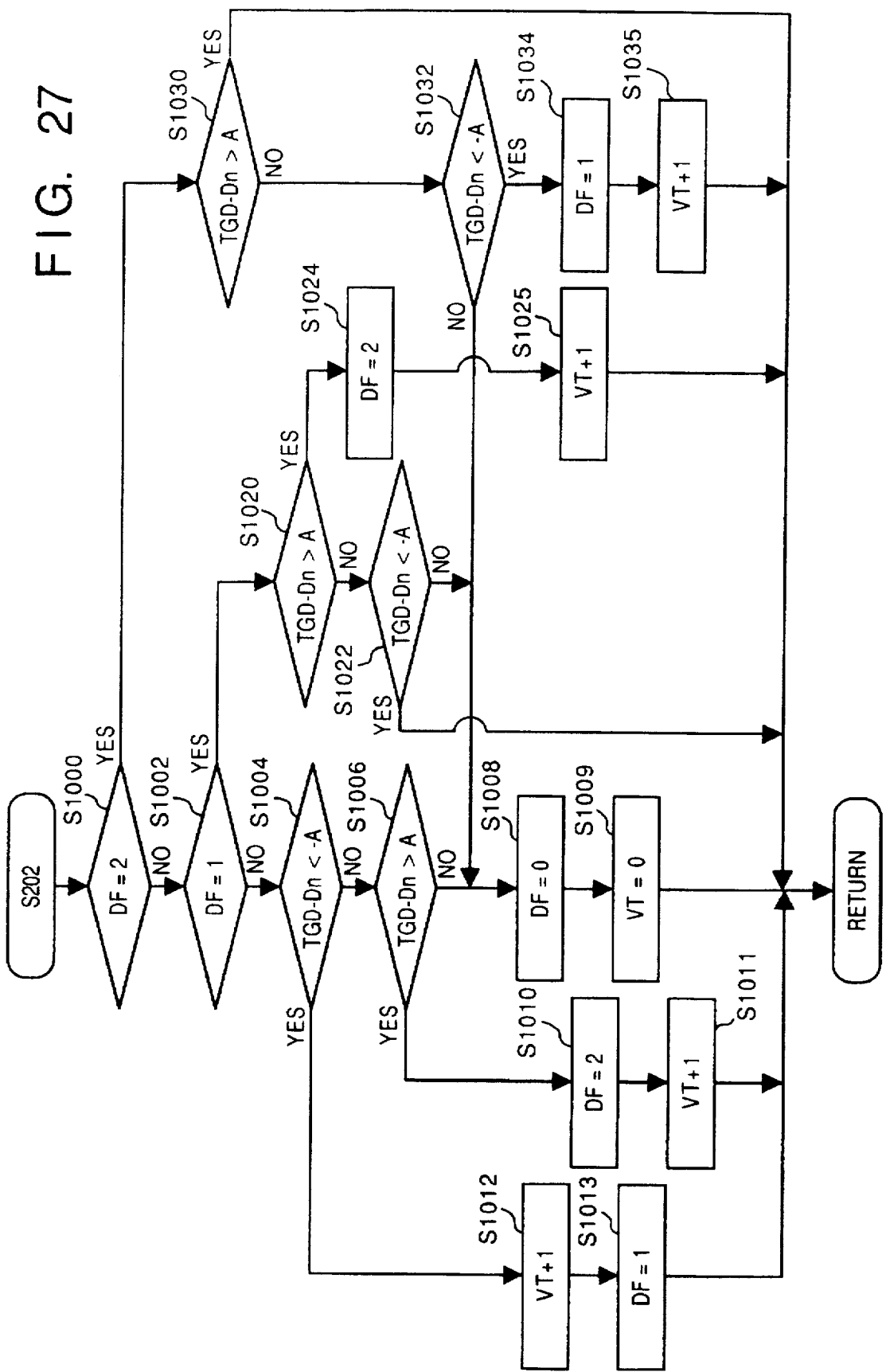
FIG. 27 is a flow chart showing the control sequence according to the third modification.

In order to execute such control, in the control sequence according to the third modification, steps S218 to S232 in FIG. 20 in the above embodiment are modified to those in the control sequence shown in FIG. 27. Also, some steps in FIG. 9 are modified, as shown in FIG. 28.

Figure 28:
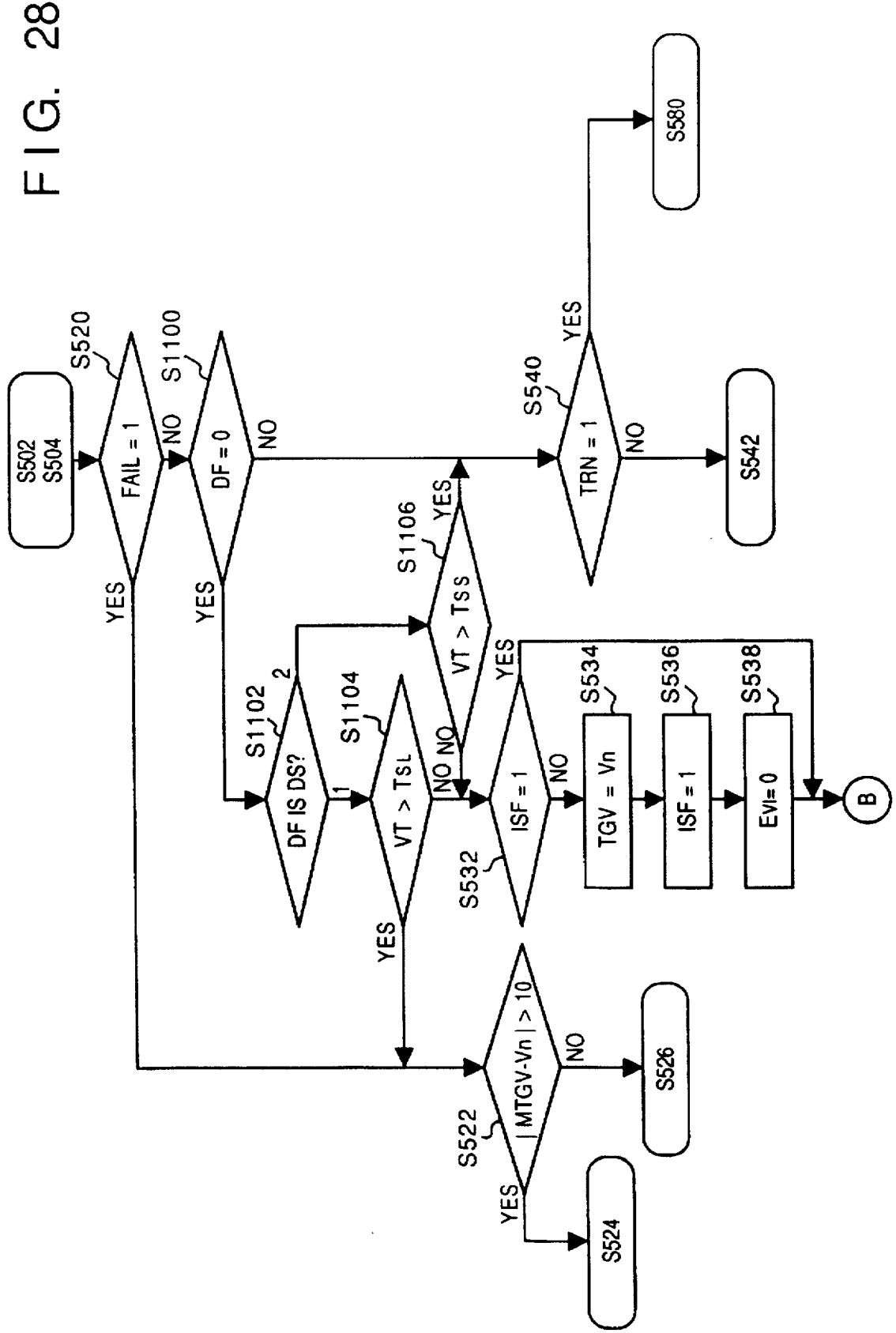
FIG. 28 is a flow chart showing the control sequence according to the third modification.

In the control sequence shown in FIG. 27, the deviation between the target vehicle-interval distance TGD and the distance $D_n$ to the object ahead at that time is calculated, and is compared with a threshold value A. Then, the comparison result is stored in a vehicle-interval distance flag DF. More specifically, the contents of the flag DF are as follows:

DF=0→the target vehicle-interval distance TGD coincides with the actual vehicle-interval distance $D_n$ DF=1→the actual vehicle-interval distance $D_n$ is larger than the target vehicle-interval distance TGD DF=2→the actual vehicle-interval distance $D_n$ is smaller than the target vehicle-interval distance TGD Based on this flag DF, and the signal missing time VT measured in step S212 in FIG. 20, cutting in of a vehicle and erroneous recognition of the vehicle ahead are distinguished from each other according to the control sequence shown in FIG. 28.

More specifically, in steps S1100 and S1102 in FIG. 28, the value of the flag DF is checked. If DF=0, i.e., if the vehicle ahead is locked on within the target vehicle-interval distance TGD, the flow advances to step S540, and the same D-type F/B control as in the above embodiment (FIG. 10) is executed.

If DF=1, the value held in the signal missing timer VT is compared with a predetermined threshold value $T_{SL}$ in step S1104. Note that the timer VT holds the time measured in steps S1011, S1012, S1025, and S1035, i.e., the continuous time of a state wherein the actual vehicle-interval distance is larger or smaller than the target vehicle-interval distance. The threshold value $T_{SL}$ is substantially the same as $T_s$ in step S530 in FIG. 9. That is, if VT>$T_{SL}$, the flow advances to step S522 to "completely" shift the control mode from the D-type F/B control to the S-type F/B control; if VT≤$T_{SL}$, the flow advances to step S532 to "temporarily" shift the control mode from the D-type F/B control to the S-type F/B control. The difference between the "complete" shift and "temporary" shift to the S-type F/B control has already been described in the above embodiment. That is, when the actual vehicle-interval distance $D_n$ is larger than the target vehicle, the control is shifted to the S-type F/B control because it is meaningless to continue the D-type F/B control.

On the other hand, if DF=2, the flow advances to step S1106, and the missing time VT and the threshold value $T_{ss}$ are compared with each other. Even when the actual vehicle-interval distance $D_n$ is smaller than the target vehicle-interval distance (DF=2), i.e., even if an object which is seemed to be a vehicle is present a small distance ahead of the own vehicle, since it is detected that the time VT in which the object ahead is present nearer than the target vehicle-interval distance position is shorter than the threshold value time $T_{ss}$, it is highly probable that the object is detected due to a pitch motion or a curve traveling state. For this reason, the control does not stay in the D-type F/B control, and advances to step S1106 to "temporarily" shift the control mode to the S-type F/B control. On the contrary, when an object which seems to be a vehicle is present a small distance ahead of the own vehicle, and when the time VT in which the object ahead is present a small distance ahead of the own vehicle is longer than the threshold value time $T_{ss}$, the object is determined to be a vehicle which has cut in between the vehicle ahead and the own vehicle. The flow then advances to step S540 to continue the D-type F/B control. More specifically, the D-type F/B control is executed using the cut-in vehicle as a target.

Effect of Third Modification

According to the third modification described above, not only a cut-in vehicle ahead can be accurately determined, but also the D-type F/B control can be continued while changing a target vehicle of the D-type F/B control from the previous vehicle ahead to the cut-in vehicle, thus improving safety.

As many apparently widely different embodiments of the present invention can be made without departing from the spirit and scope thereof, it is to be understood that the invention is not limited to the specific embodiments thereof except as defined in the appended claims.

What is claimed is:

1. A cruise control apparatus, comprising:
   a switch operated by a driver which outputs a signal indicative of operation information for target vehicle speed;
   vehicle-speed based auto-cruising control means for determining a target vehicle speed based on the signal indicative of operation information for target vehicle speed, and controlling a vehicle speed toward the target vehicle speed;

vehicle-interval distance based auto-cruising control means for maintaining a vehicle-interval distance to a vehicle ahead to be a desired target vehicle-interval distance;

determining means for determining whether a traveling condition when the switch is operated by the driver is a predetermined traveling condition under which said vehicle-interval distance based auto-cruising control means is operable or not operable; and conversion means for converting, where said vehicle-interval distance based auto-cruising control means is operable, the signal indicative of the operation information for target vehicle speed into a signal indicative of operation information for target vehicle-interval distance to output the converted signal to said vehicle-interval distance based auto-cruising control means, and for converting, where said vehicle-interval distance based auto-cruising control means is not operable, the signal indicative of the operation information for target vehicle speed into a signal indicative of operation information for target vehicle speed to output the converted signal to said vehicle-speed based auto-cruising control means.

2. The apparatus according to claim 1, further comprising means for exclusively switching a driving mode between a vehicle-speed based mode in which said vehicle-speed based auto-cruising control means operates, and a vehicle-interval distance based mode in which said vehicle-interval distance based auto-cruising control means operates, wherein said conversion means is enabled to operate in the vehicle-interval distance based mode.

3. The apparatus according to claim 1, wherein said switch is a push-button type SET switch for setting the target vehicle speed, and when it is detected that said SET switch is depressed for a short period of time under the predetermined traveling condition, said conversion means sets a distance to the vehicle ahead obtained when said SET switch is depressed to be the target vehicle-interval distance, and outputs the target vehicle-interval distance to said vehicle-interval distance based auto-cruising control means.

4. The apparatus according to claim 1, wherein said conversion means is triggered to operate in accordance with an operation time of said switch by the driver.

5. The apparatus according to claim 1, wherein said switch is a RESUME switch for an operation for resuming an auto-cruising operation after the auto-cruising operation is temporarily canceled, and said conversion means instructs said vehicle interval distance based auto-cruising control means to restart vehicle-interval distance based auto-cruising control when said RESUME switch is depressed under the predetermined traveling condition.

6. The apparatus according to claim 1, wherein said switch is arranged near a steering wheel.

7. The apparatus according to claim 1, wherein the conversion means determines that the predetermined traveling condition is a travelling condition under which said vehicle-interval distance based auto-cruising control means is operable when a vehicle-interval distance to a vehicle ahead is within a predetermined range.

8. The apparatus according to claim 1, wherein the conversion means determines that the predetermined traveling condition is a travelling condition under which said vehicle-interval distance based auto-cruising control means is operable when the vehicle is traveling straight.

9. The apparatus according to claim 1, wherein the conversion means, while said switch is continuously operated by the driver under the predetermined travelling condition, converts an operation signal from the switch into a control signal to change the vehicle speed, and sets an interval distance to the vehicle ahead at the time when the operation of the switch is stopped by the driver, and outputs the set interval distance as a target interval distance to said vehicle-interval distance based auto-cruising control means.

10. The apparatus according to claim 9, wherein said switch is a push-button type SET switch for setting the target vehicle speed, and while said SET switch is continuously depressed under the predetermined traveling condition, said conversion means converts a signal indicating the depression operation into a signal for increasing a vehicle speed, sets a distance to the vehicle ahead obtained when said SET switch is released to be the target vehicle-interval distance, and outputs the target vehicle-interval distance to said vehicle-interval distance based auto-cruising control means.

11. The apparatus according to claim 9, wherein said switch is a COAST switch for decreasing the target vehicle speed, and while said COAST switch is continuously depressed under the predetermined traveling condition, said conversion means converts a signal indicating the depression operation into a signal for decreasing a vehicle speed, sets a distance to the vehicle ahead obtained when said COAST switch is released to be the target vehicle-interval distance, and outputs the target vehicle-interval distance to said vehicle-interval distance based auto-cruising control means.

12. A cruise control apparatus, comprising:

a switch for outputting a predetermined signal in accordance with an operation of a driver, said predetermined signal indicating an execution of a vehicle-speed based auto-cruising control and a vehicle-interval distance based auto-cruising control;

conversion means for converting the predetermined signal from said switch into a signal indicative of a target vehicle speed where the vehicle-interval distance based auto cruising control is not operable to output to vehicle-speed based auto-cruising control means, and for converting the predetermined signal from said switch into a signal indicative of a target vehicle-interval distance where the vehicle-interval distance based auto cruising control is operable to output to vehicle-interval distance based auto-cruising means:

vehicle-speed based auto-cruising control means for controlling a vehicle speed toward the target vehicle speed on the basis of the converted signal indicative of the target vehicle speed; and vehicle-interval distance based auto-cruising control means for controlling the vehicle speed to maintain a vehicle-interval distance to a vehicle ahead at the target vehicle-interval distance on the basis of the converted signal indicative of the target vehicle-interval distance.

13. The apparatus according to claim 12, wherein said switch is arranged near a steering wheel.

14. The apparatus according to claim 12, wherein said switch is a push-button type SET switch for setting a target vehicle speed, and when it is detected that said SET switch is depressed for a short period of time, said vehicle-interval distance based auto-cruising control means in response to the switch sets a distance to the vehicle ahead obtained upon depression of said SET switch to be the target vehicle-interval distance.

15. The apparatus according to claim 12, further comprising:

means for, when said control apparatus is started, setting a control mode of said control apparatus in a first mode for controlling the vehicle speed toward the target vehicle speed; and means for, when it is detected in the first mode that the vehicle-interval distance becomes close to a predetermined target vehicle-interval distance, changing the control mode of said control apparatus from the first mode to a second mode for maintaining the vehicle-interval distance to be the target vehicle-interval distance.

16. The apparatus according to claim 12, wherein said vehicle-speed based auto-cruising control means comprises means for measuring a vehicle speed, and means for converting the predetermined signal from said switch into the signal indicative of target vehicle speed on the basis of the measured vehicle speed, and wherein said vehicle-interval distance based auto-cruising control means comprises means for measuring an interval distance to the vehicle ahead, and means for converting the signal from said switch into the signal indicative of target vehicle-interval distance on the basis of the measured interval distance.

17. A cruise control apparatus, which can individually execute vehicle-speed based auto-cruising control for controlling a vehicle speed toward a target vehicle speed, and vehicle-interval distance based auto-cruising control for controlling a vehicle speed to maintain a vehicle-interval distance to a vehicle ahead to be a target vehicle-interval distance, comprising:

an operation member including a first switch which can be operated by a driver;

an operation sensor for detecting the operation of said first switch by the driver;

a vehicle speed sensor for detecting a vehicle speed;

a distance sensor for detecting a vehicle-interval distance to the vehicle ahead;

a conversion section for receiving outputs from said operation sensor, said vehicle speed sensor, and said distance sensor, for, when said first switch is operated in a vehicle-speed based auto-cruising mode, converting vehicle speed data detected by said vehicle speed sensor at that time into target vehicle speed data, and for, when said first switch is operated in a vehicle-interval distance based auto-cruising mode, converting vehicle-interval distance data detected by said distance sensor at that time into target vehicle-interval distance data; and a control section operatively connected to said sensors and said conversion section for controlling the vehicle speed toward the converted target vehicle speed in the vehicle-speed based auto-cruising mode, and for controlling the vehicle-interval distance to the vehicle ahead toward the converted target vehicle-interval distance in the vehicle-interval distance based auto-cruising mode.

18. The apparatus according to claim 17, wherein said first switch comprises a push-button type SET switch, and when it is detected in the vehicle-interval distance based auto-cruising mode that said SET switch is depressed for a predetermined period of time, said conversion section sets a vehicle-interval distance obtained when said SET switch is released to be the target vehicle-interval distance.

19. The apparatus according to claim 17, wherein said operation member comprises a COAST switch as a second switch, and when it is detected in the vehicle-interval distance based auto-cruising mode that said COAST switch is depressed, said conversion section sets a vehicle-interval distance obtained when said COAST switch is released to be the target vehicle-interval distance.

20. A cruise control apparatus, comprising:

a switch for outputting a switching signal in accordance with an operation of a driver, said switching signal indicating that a target vehicle speed is to be changed;

vehicle-speed based auto-cruising control means for converting a signal from said switch into a target vehicle speed signal where a vehicle-interval distance control is not operable and controlling a vehicle speed toward a target vehicle speed on the basis of the converted signal;

vehicle-interval distance based auto-cruising control means for converting the signal from said switch into a target vehicle-interval distance signal where a vehicle-interval distance control is operable and controlling a vehicle speed to maintain a vehicle-interval distance to a vehicle ahead to be a target vehicle-interval distance on the basis of the converted signal; and conversion means for, while said switch is continuously operated by the driver where the vehicle-interval distance control is operable, converting the switching signal from the switch into a control signal to change the vehicle speed, and sets an interval distance to the vehicle ahead at the time when the operation of the switch is stopped by the driver and outputs the set interval distance as a target interval distance to said vehicle-interval distance based auto-cruising control means.

21. The apparatus according to claim 20, wherein said switch is a push-button type SET switch for setting a target vehicle speed, and while said SET switch is continuously depressed, said conversion means converts a signal indicating the depression operation into a signal for increasing the vehicle speed, and sets a distance to the vehicle ahead obtained when said SET switch is released to be the target vehicle-interval distance.

22. The apparatus according to claim 20, wherein said switch is a COAST switch for decreasing the target vehicle speed, and while said COAST switch is continuously depressed, said conversion means converts a signal indicating the depression operation into a signal for decreasing the vehicle speed, and sets a distance to the vehicle ahead obtained when said COAST switch is released to be the target vehicle-interval distance.

* * * * *

UNITED STATES PATENT AND TRADEMARK OFFICE
CERTIFICATE OF CORRECTION

PATENT NO. : 5,695,020

DATED : December 9, 1997

INVENTOR(S) : Eiji Nishimura

It is certified that error appears in the above-identified patent and that said Letters Patent is hereby corrected as shown below:

| | |
|---|---|
| Col. 5, | line 24, begin a new paragraph with "The". |
| Col. 8, | line 51, "a" (second occurrence) should be --$\underline{a}$--; |
| | line 58, "a" should be --$\underline{a}$--. |
| Col. 9, | line 19, "a" should be --$\underline{a}$--. |
| Col. 12, | line 64 (eq.(15), "ITGD-$D_n$<$D_o$" should be --$|TGD - D_n| < D_o$--. |
| Col. 18, | line 41 (eq.(27), "ITGD-$D_n$<$D_s$" should be --$|TGD - D_n| < D_s$--. |
| Col. 19, | line 63, after "sensor" insert --10--. |

Signed and Sealed this

Twenty-first Day of July, 1998

Attest:

BRUCE LEHMAN

*Attesting Officer*      *Commissioner of Patents and Trademarks*